United States Patent

Kudoh et al.

[11] Patent Number: 5,812,367
[45] Date of Patent: Sep. 22, 1998

[54] SOLID ELECTROLYTIC CAPACITORS COMPRISING A CONDUCTIVE LAYER MADE OF A POLYMER OF PYRROLE OR ITS DERIVATIVE

[75] Inventors: Yasuo Kudoh, Yokohama; Kenji Akami, Atsugi; Toshikuni Kojima, Kawasaki; Yasue Matsuya, Sagamihara; Hiroshi Shimada, Kyoto; Chiharu Hayashi, Osaka, all of Japan

[73] Assignee: Matsushita Electric Industrial Co., Ltd., Osaka, Japan

[21] Appl. No.: 840,445

[22] Filed: Apr. 1, 1997

[30] Foreign Application Priority Data

Apr. 4, 1996 [JP] Japan ................................ 8-082320
Sep. 17, 1996 [JP] Japan ................................ 8-244397

[51] Int. Cl.⁶ .................................................. H01G 9/00
[52] U.S. Cl. .......................... 361/523; 361/529; 29/25.03
[58] Field of Search .......................... 29/25.03; 361/502, 361/503, 504, 531, 509, 524, 523, 525, 526, 529; 205/152, 103, 153, 166, 167; 204/414, 421; 429/192, 193, 209

[56] References Cited

U.S. PATENT DOCUMENTS 4,697,000  9/1987  Witucki et al. ........................ 528/423
4,697,001  9/1987  Walker et al. ........................ 528/423
5,071,521  12/1991 Kojima et al. ........................ 205/153
5,119,274  6/1992  Kinuta et al. ........................ 361/525
5,421,982  6/1995  Ikeda et al. ........................ 204/14

FOREIGN PATENT DOCUMENTS 63-158829  7/1988   Japan .
63-173313  7/1988   Japan .
1-253226  10/1989   Japan .
2-15611    7/1990   Japan .

OTHER PUBLICATIONS

"Effective Doping of Polymer Anion During Chemical Polymerization of Pyrrole Using $Fe(OH)_3$ Oxidant", Ohtani et al., Bull Chem. Soc. Jpn., vol. 62, No. 1, pp. 234–238, 1989.

Primary Examiner—Kristine L. Kincaid
Assistant Examiner—Anthony Dinkins
Attorney, Agent, or Firm—McDermott, Will & Emery

[57] ABSTRACT

A solid electrolytic capacitor is composed of a pair of electrodes and a dielectric film therebetween, wherein one electrode includes a conducting polymer doped with a polyvalent anion and a monovalent anion. The conducting polymer layer may have a multi-layer structure wherein a second or third conductive polymer layer is made of doped thiophene or derivative thereof.

21 Claims, 4 Drawing Sheets

SOLID ELECTROLYTIC CAPACITORS COMPRISING A CONDUCTIVE LAYER MADE OF A POLYMER OF PYRROLE OR ITS DERIVATIVE

BACKGROUND OF THE INVENTION

1. Field of the Invention

This invention relates to capacitors which exhibit good capacitor characteristics such as frequency characteristics and dielectric strength characteristics and more particularly, to small-sized, large capacitance, solid electrolytic capacitors of the type which comprises at least one conductive polymer layer doped with a mixed dopant composed of a polyvalent anion and a monovalent anion. The invention also relates to a method for making such capacitors as mentioned above.

2. Description of the Prior Art

The digitalization of electric and electronic appliances which has been recently in progress requires capacitors of the type which is small in size and great in capacitance with a low impedance in a high frequency range.

Conventional capacitors which have been in use in a high frequency range include, for example, plastic capacitors, mica capacitors and layer-built ceramic capacitors. However, these capacitors are so large in size that it is difficult to realize a great capacitance.

Capacitors of a large capacitance type include, for example, electrolytic capacitors such as aluminium dry electrolytic capacitors and aluminium or tantalum solid electrolytic capacitors. These capacitors have a very thin oxide film serving as a dielectric and can thus realize a large capacitance. However, such a very thin oxide film is very liable to suffer damages. In order to repair the damages, it is necessary to form an electrolyte layer on the oxide film. The electrolyte layer serves also as a true cathode.

For instance, with aluminium dry capacitors, a liquid electrolyte is used such that anodic and cathodic aluminium foils which have been, respectively, etched on the surfaces thereof are convolutely wound through a separator, in which the liquid electrolyte is impregnated. The liquid electrolyte exhibits ionic conductivity and is so great in specific resistance that a great loss is incurred, thereby presenting the problem that the resultant capacitor is great in loss and very poor in frequency characteristics of impedance and temperature characteristics. In addition, the use of the liquid electrolyte inevitably involves the leakage and evaporation of the electrolyte, coupled with another problem that the capacitor undesirably decreases in capacitance and increase in loss as time passes.

Tantalum solid electrolytic capacitors make use of a manganese oxide electrolyte and can overcome the problems on the variations of temperature characteristics, capacitance and loss in relation to time. However, the manganese oxide electrolyte is relatively high in specific resistance. This leads to the frequency characteristics of impedance which are poorer than those of layer-built ceramic capacitors or film capacitors.

Additionally, the formation of the manganese oxide electrolyte layer essentially requires repetition of several to several tens of cycles of the step of immersion in a manganese nitrate solution and subsequent thermal decomposition at a temperature of about 300° C., thus being complicated in the formation step.

In recent years, another type of solid electrolyte capacitor have been proposed wherein after formation of a conductive layer such as of a metal, a conductive metal oxide or a conductive polymer such as polypyrrole on a dielectric film, another conductive polymer such as polypyrrole is further formed via the first-mentioned conductive layer by electrolytic polymerization (Japanese Laid-open patent Application Nos. 63-158829, 63-173313 and 1-253226).

Further, large-capacitance film capacitors have also been proposed wherein the dielectric thin film made of an electrodeposited polyimide is formed on an etched aluminium foil on which conductive polymer films are successively formed by chemical polymerization and electrolytic polymerization, respectively, thereby forming an electrode (The technical Report at the 58th Meeting of the Electrochemical Society, pp. 251 to 252 (1991)).

However, where an electrolytically polymerized polymeric product is formed through the conductive, thermally decomposed metal oxide such as manganese dioxide, the dielectric film is very liable to be damaged during the course of the thermal decomposition. In order to obtain a capacitor having a high dielectric strength, it becomes necessary to repair the dielectric layer prior to the electrolytic polymerization, thus presenting the problem that the procedure becomes more complicated.

As having set out hereinabove, with the tantalum solid electrolytic capacitors, the electrolyte composed of manganese oxide is formed by repeating the thermal decomposition cycle. To repair the film damaged during the repetition of the thermal decomposition cycle requires the formation of a dielectric film after every cycle of the thermal decomposition. This also involves the problem of complicating the procedure.

Moreover, where a conductive polymer layer is formed by chemical polymerization, it has been found difficult to form the conductive polymer layer at a high packing rate to the depth of irregularities of an etched aluminium foil or to the depth of fine pores of a tantalum sintered body. Additionally, the use of an electrolytically polymerized product having high conductivity may lead to the lowering of the dielectric strength of the resulting capacitor.

SUMMARY OF THE INVENTION

It is accordingly an object of the invention to provide a solid electrolytic capacitor which overcomes the problems of the prior art counterparts and which ensures a high capacitance and is resistant to heat and moisture.

It is another object of the invention to provide a solid electrolytic capacitor in the form of a film and is thus small in size and large in capacitance.

It is a further object of the invention to provide a solid electrolytic capacitor which comprises, as at least one electrode, a conductive polymer layer made of a conductive polymer of pyrrole or its derivative.

It is a still further object of the invention to provide a method for making solid electrolytic capacitors of the type mentioned above.

According to one embodiment of the invention, there is provided a solid electrolytic capacitor which comprises a pair of electrodes, and a dielectric film provided between the paired electrodes wherein at least one of the paired electrodes is made of a conductive polymer of a member selected from the group consisting of pyrrole and derivatives thereof, the conductive polymer being doped with a mixed dopant of a polyvalent anion and a monovalent anion consisting of a sulfonate ion dissociated from an anionic surface active agent.

If the other electrode is made of a valve metal, the dielectric film may consist of an oxide of the valve metal. Alternatively, the dielectric film may be made of a polyimide. If the polyimide dielectric film is used, both electrodes may be made of the conductive polymer although an anode may be made of a valve metal.

The at least one electrode may be made of such a conductive polymer layer as mentioned above, but should preferably have a double-layered structure or a multi-layered structure which comprises, aside from the conductive polymer layer of pyrrole or its derivative, at least one layer made of a conductive polymer of a thiophene derivative represented by the following general formula

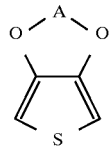

wherein A represents an unsubstituted or substituted alkylene group.

According to another embodiment of the invention, there is provided a method for making a solid electrolytic capacitor which comprises the steps of providing an electrode, forming a dielectric film on the electrode, and forming a counter electrode on the dielectric film wherein the counter electrode comprises a conductive polymer layer made of a polymer of pyrrole or its derivative doped with a mixed dopant comprising a polyvalent anion and a monovalent anion derived from an anionic surface active agent comprising a sulfonate anion.

DETAILED DESCRIPTION AND EMBODIMENTS OF THE INVENTION

Figure 1A:
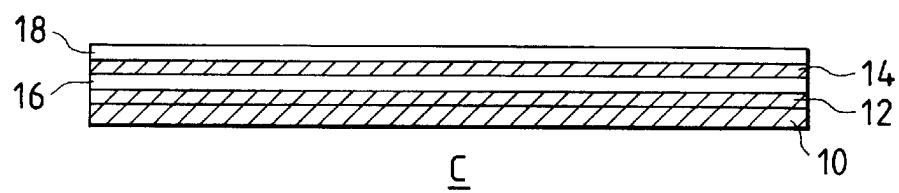
FIG. 1A is a schematic side view of a fundamental arrangement of a solid electrolytic capacitor according to the invention and FIG. 1B is a schematic side view of a solid electrolyte layer having a double-layered or multilayered structure in the capacitor.
Figure 1B:
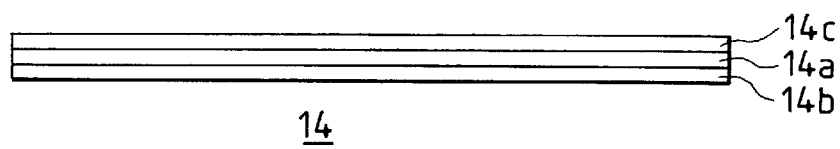

Reference is now made to the accompanying drawings and particularly to FIGS. 1A and 1B which schematically show a fundamental arrangement of a solid electrolytic capacitor according to the invention.

As shown in FIG. 1A, a solid electrolytic capacitor unit C according to the invention essentially includes an electrode 10 having a dielectric layer 12 and a solid electrolyte layer 14. The solid electrolyte layer 14 is made of a conductive polymer doped with a mixed dopant which consists of a polyvalent anion and a monovalent anion. These essential components are shown as shaded in FIG. 1A. The capacitor unit C having the electrode 10, the dielectric layer 12 and the solid electrolyte layer 14 is a minimum and fundamental capacitor unit of the invention.

The electrode 10 may be made of either a valve metal or a conductive polymer of pyrrole or its derivative as used for the solid electrolyte layer 14. The valve metal includes, for example, aluminium or tantalum although other metals such as zirconium, niobium, hafnium, titanium and intermetallic compounds thereof may also be used. Preferably, aluminium or tantalum is used. In this case, the electrode 10 serves as an anode. If the valve metal is used, the dielectric film 12 is formed by anodization to provide a valve metal oxide, e.g. aluminium oxide or tantalum oxide. On the other hand, if the dielectric film 12 is made of a dielectric polymer such as a polyimide, either a valve metal as mentioned above or a conductive polymer layer may be used as the electrode 10.

The electrode 10 made of a valve metal may be in the form of a foil, a sheet, or a sintered body. Preferably, the foil or sheet is chemically etched on the surfaces thereof. The electrode 10 made of a conductive polymer will be described hereinafter when reference is made to the solid electrolyte layer 14 because the electrode 10 may be the same as the solid electrolyte layer 14 with respect to the composition or the structural arrangement thereof.

As set out above, the dielectric film may be made of a valve metal oxide when the electrode 10 is composed of a valve metal such as Al or Ta. Alternatively, a polyimide may be likewise used as the dielectric film. Examples of the polyimide include those which have recurring units of the following formulas (1) to (3)

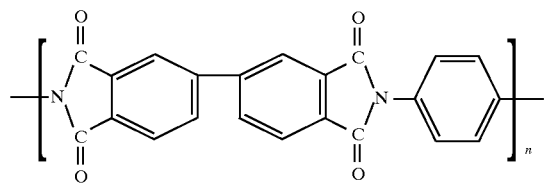

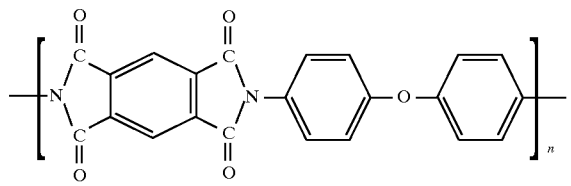

(2)

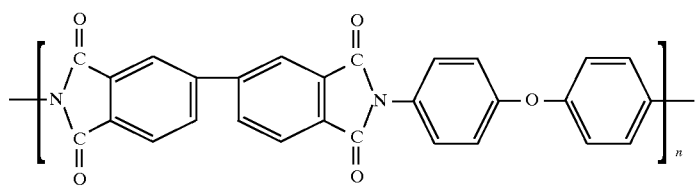

(3)

wherein n is an integer sufficient to form a polymer film and, for example, ranging from several hundreds to several thousands.

The solid electrolyte layer 14 should be made of a conductive polymer of pyrrole or its derivative doped with a mixed dopant composed of a polyvalent anion and a monovalent anion. In this case, the layer 14 is of the single-layered type. The conductive polymer layer 14 serves as a true cathode when the dielectric film is constituted of a valve metal oxide. On the other hand, where the dielectric film is constituted of a polyimide, the conductive polymer layer 14 serves merely as a counter electrode.

The derivatives of pyrrole include, for example, 3, or 3,4-alkyl or aryl pyrroles such as 3-methylpoyrrole, 3-phenylpyrrole, 3-methyl-4-phenylpyrrole and the like, N-substituted pyrroles such as an N-alkylpyrroles such as N-methylpyrrole, substituted N-arylpyrrolees such as nitrophenylpyrrole and the like. The mixed dopant should comprise both a polyvalent anion and a monovalent anion.

Where an anionic surface active agent capable of yielding a monovalent anion is used, for example, in a polymerization system, the monovalent ions dissociated from the surface active agent are incorporated in the resultant polymer product competitively with a polyvalent anion of an oxidant such as, for example, a salt of a transition metal and a polyvalent acid.

The polyvalent anions are supplied from the salts of transition metals and polyvalent acids used as an oxidant. Examples of the transition metals include iron (III), copper (II), chromium (VI), cerium (IV), ruthenium (III) and manganese (VII). Examples of the polyvalent acids include sulfuric acid, phosphoric acid, permanganic acid, chromic acid, bichromic acid and the like. Preferred polyvalent anions include sulfate.

The monovalent anions should be those derived from surface active agents and include, for example, sulfonates, carboxylates, sulfinates, and the like, of which sulfonates are preferred. More preferably, aromatic sulfonates such as alkylnaphthalenesulfonate and dodecylbenzenesulfonate are used. It should be noted that the term "alkylnaphthalenesulfonate" is intended to mean a mixture of alkylnaphthalenesulfonates having alkyl moieties having from 3 to 6 carbon atoms and such an alkylnaphthalenesulfonate is commercially available from Takemoto Oils Co., Ltd. under the designation of A-43-F.

The mixed dopant is preferably present in an amount sufficient to provide a given level of electric conductivity and is in the range of 20 to 40 mole % based on the conductive polymer product. The ratio by mole between the polyvalent and monovalent anions is preferably in the range of 1:9 to 1:999, more preferably 1:9 to 1:99.

The solid electrolyte layer 14 made of the doped conductive polymer of pyrrole or its derivative has been described above as a single layer. This layer 14 should preferably have a double-layered structure or a multi-layered structure as shown in FIG. 1B. More particularly, the layer 14 may have a double-layered structure including a sub-layer 14a and a sub-layer 14b or a three-layered structure including a sub-layer 14a, and sub-layers 14b and 14c formed on opposite sides of the sub-layer 14a. In both cases, the sub-layer 14a is made of a conductive polymer of pyrrole or its derivative as having set out with respect to the single-layered solid electrolyte layer 14 in FIG. 1A.

The sub-layer 14b of the double-layered structure is formed in contact with the dielectric layer 12. Both sub-layers 14b and 14c are made of a conductive polymer of a thiophene derivative of the following formula

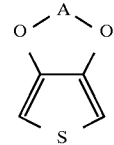

wherein A represents an unsubstituted or substituted alkylene group. The alkylene group should preferably have 2 to 6 carbon atoms.

The thiophene derivative is obtained, for example, by reacting an alkali metal of 3,4-dihydroxythiophene-2,5-dicarboxylate with an appropriate alkylene-vic-dihalide, followed by hydrolysis to obtain 3,4-(alkylene-vic-dioxy)thiophene-2,5-carboxylic acid and further decarboxylation (Polymer, Vol. 36, No. 7 (1994), p. 1347; The Tetrahedron, Vol. 23 (1967), p. 2437; and J. Am. Chem. Soc. Vol. 67 (1945), p. 2217).

The alkylene group which may be substituted includes 1,2-alkylene groups obtained from alpha-olefins such as ethene, 1-propene, 1-hexene and the like. Besides, 1,2-cyclohexene, 2,3-butylene, 2,3-dimethylene, and 2,3-pentylene may also be used. Preferably, methylene, 1,2-ethylene, and, 2-propylene are mentioned.

The sub-layers 14b and 14c are preferably doped with a dopant comprising at least a monovalent anion. By this, the yield and electric conductivity of the sub-layers 14b and 14c increase. The monovalent anions are preferably ones derived from anionic surface active agents which have been defined hereinbefore with respect to the single-layered structure of the solid electrolyte layer 14. More preferably, the monovalent anion consists of a sulfonate dissociated from anionic surface active agents. Alternatively, the sulfonate anions may be a polystyrenesulfonate anion. When using the polystyrenesulfonate anion, the capacitor characteristics and the heat resistance can be improved.

As in the case of the single-layered structure of the solid electrolyte layer 14, the polyvalent anions may also be contained in the sub-layers 14b, 14c. If the polyvalent anions are present in an oxidant solution, the monovalent anion such as a sulfonate anion is competitively incorporated in the resultant conductive polymer. The polyvalent anions may be those defined with respect to the solid electrolyte layer 14. More particularly, the polyvalent anion should preferably be supplied from salts of transition metals and polyvalent acids as having illustrated with respect to the single-layered structure. Examples of the transition metal include iron (III), copper (II), chromium (VI), cerium (IV), ruthenium (III) and manganese (VII). Examples of the polyvalent acids include sulfuric acid, phosphoric acid, permanganic acid, chromic acid, bichromic acid and the like. Preferred polyvalent anions include a sulfate anion.

The dopant, which is either in the form of a mixed dopant or a single dopant, in the sub-layers 14b, 14c should preferably be present in an amount of 20 to 40% by mole based on the conductive polymer composition. When a mixed dopant consisting of a polyvalent anion and a monovalent anion is used, the mixing ratio by mole between the polyvalent and monovalent anions is preferably in the range of 1:9 to 1:999.

The capacitor of the present invention may further comprise a manganese oxide layer 16 between the dielectric film 12 and the solid electrolyte layer or conductive polymer layer 14, which is either of the single-layered type or a multi-layered type, as is particularly shown in FIG. 1A. The manganese dioxide layer which has a relatively low electric conductivity can lower an increasing rate of leakage current accompanied by an increasing voltage being applied to the capacitor.

Although the conductive polymer layer 14 serves as a true electrode, it is usual to form a lead electrode on the layer 14. The lead electrode 18 is made, for example, of a carbon layer and a silver paint layer (both not shown) formed by a usual manner with or without a metallic lead (not shown) attached to the silver paint layer.

The capacitor unit may be covered with a thermosetting resin such as an epoxy resin to protect the unit. Alternatively, the unit may be encased in an appropriate casing, if necessary.

The method for making such a solid electrolytic capacitor as set out hereinbefore is described.

The capacitor C including the fundamental arrangement having the electrode 10, the dielectric film 12 and the conductive polymer layer 14 as shown in FIG. 1A can be made by the following method when using a valve metal as the electrode 10. The method comprises providing a valve metal piece in the form of a foil, a sheet or a sintered body, anodizing the valve metal piece to form a dielectric film 12 on at least one side of the valve metal piece, and forming a conductive polymer layer 14 on the dielectric film 12 wherein the conductive polymer layer 14 is made of a conductive polymer of pyrrole or its derivative doped with a mixed dopant as defined before.

The conductive polymer layer 14 should preferably be formed by chemical polymerization of a monomer in a polymerization system although electrolytic polymerization may be used. The chemical polymerization proceeds in the vicinity of room temperature. This is advantageous in that the dielectric film, which is either a valve metal oxide or a polyimide film, is prevented from being damaged owing to the application of heat thereto.

Especially, when the dielectric film is made of a valve metal oxide, a manganese oxide may be further formed thereon by any known techniques such as thermal decomposition of manganese salts. When the manganese dioxide layer is formed between the dielectric film and the conductive polymer layer, the resultant solid electrolytic capacitor exhibits only a low leakage current.

The anodization of a valve metal may be effected by any known technique. For instance, a valve metal piece is placed in an acidic solution, to which a given potential is applied at an elevated temperature of 70° to 95° C. to form a dielectric oxide film on the valve metal piece. As a matter of course, the dielectric film may be formed on one side of the metal piece or may be formed to entirely cover the metal piece therewith.

The chemical polymerization is conducted to form the conductive polymer layer on the dielectric film. More particularly, the chemical polymerization comprises immersing the dielectric film-bearing valve metal piece in a monomer solution comprising a monomer of pyrrole or its derivative, and an anionic surface active agent capable of yielding a monovalent sulfonate anion for a time of 1 to 60 minutes, further immersing the thus immersed piece in an oxidant solution comprising a salt capable of yielding a polyvalent anion with or without an anionic surface active agent as used above for a time of 2 to 120 minutes, and repeating the above immersion steps until a desired thickness of a doped conductive layer is formed. This reaction proceeds at room temperature although higher or lower temperatures may be used.

In the first immersion step, it is preferred that the monomer solution comprises 0.05 to 1 mole/liter of the monomer, and 0.1 to 10 wt % of the surface active agent. In the second immersion step, the salt is preferably present in an amount of 0.1 to 1 mole/liter of the oxidant solution and the surface active agent is preferably present in an amount of 0.1 to 1 wt % based on the oxidant solution. The immersion steps are usually repeated several to several tens of times whereby the resultant doped conductive layer has a thickness of 1 to 30 $\mu$m.

Alternatively, a monomer, an anionic surface active agent and an oxidant may be mixed together in an aqueous medium such as water, in which the dielectric film-bearing valve metal piece is dipped or immersed to form a conductive polymer layer. The immersion may be repeated to make a desired thickness, or may be kept over a time sufficient to make a desired thickness. In this polymerization system, since the monomer readily contact the oxidant, the polymerization takes place immediately. In order to control the polymerization rate, it is preferred to keep the solution at temperatures as low as possible, which may depend on the type of medium as will be described hereinafter. The polymerization system should preferably comprise 0.05 to 1 mole/liter of the monomer, 0.1 to 1 mole/liter of the slat and 0.1 to 10 wt% of the surface active agent.

The salts serving as an oxidant are preferably ferric sulfate.

The chemical polymerization in either case is preferably conducted in a medium comprising water and an alcohol although water alone may be used as the medium. The addition of an alcohol is advantageous in that when a cation such as, for example, a transition metal cation derived from the salt between a transition metal and a polyvalent acid, and the anion derived from an anionic surface active agent are combined to provide a water-insoluble salt, such a salt can be dissolved in the alcohol. This ensures a homogeneous and uniform polymerization solution phase without causing any precipitation. If the water-insoluble matter is present, it may prevent the monomer solution or the polymerization system from quick arrival at the valleys of irregularities of an etched surface of a valve metal electrode having a dielectric film thereon or from entering into the fine pores of a sintered body of a valve metal, thereby lowering the covering rate with a conductive polymer.

Examples of the alcohol include methanol, ethanol, propanol, ethylene glycol, propylene glycol, glycerine and mixtures thereof. If an alcohol is present, its content in the polymerization medium is preferably in the range of 2 to 25 wt%.

Moreover, the polymerization reaction rate of pyrrole or its derivative can be appropriately controlled depending on the amount of an alcohol in the polymerization reaction system. More particularly, if the amount of an alcohol increases, the polymerization reaction rate can be decreased. The presence of an alcohol ensures reliable formation of a conductive polymer layer in the vicinity of a valve metal electrode. If an aqueous medium alone is used, there may arise some problem that the conductive polymer layer is unlikely to be formed to the depth of etching pits of an etched valve metal foil or sheet or to the depth of fine pores in a sintered body of a valve metal. This problem can be solved by use of an alcohol in combination with water in the monomer solution and/or in the oxidant solution, or in the polymerization system comprising all the essential components.

It should be noted that in order that a homogeneous conductive polymer is obtained using an aqueous medium alone, it has been conventional to lower the concentrations of a monomer and an oxidant and to repeat the steps of forming a conductive polymer layer more times. When using a mixed medium of water and an alcohol, higher concentrations may be used under which uniform formation of a conductive polymer at a desired portion is ensured. Thus, a reduced number of repetitions of the polymerization steps is sufficient to provide a capacitor having a high capacitance.

The chemical polymerization is preferably conducted by immersion in a monomer solution comprising a monomer of pyrrole or its derivative and an anionic surface active agent, and further immersion in an oxidant solution comprising ferric sulfate, followed by repeating the above steps.

When the anionic surface active agent is contained in the monomer and oxidant solutions, respectively, the resultant conductive polymer layer can be formed to the deep sites in the irregularities or fine pores formed by etching of a valve metal foil or sintering of a valve metal piece. A high coverage with the conductive polymer is ensured, thus resulting in a high-capacitance capacitor.

The surface active agent should be anionic in nature, and the monovalent anion dissociated therefrom is taken in the resultant polymer competitively with the polyvalent anion of a salt of a transition metal and a polyvalent acid used as an oxidant.

The anion of an anionic surface active agent has a hydrophobic group therein and is so large in size that de-doping of the anion as will be otherwise caused under high temperature or high humidity conditions can be effectively suppressed. As a result, the conductive polymer suffers only a reduced degree of degradation as time passes. The capacitor using such a conductive polymer exhibits good heat and moisture resistances.

The monovalent anion derived from the surface active agent is more likely to be taken in the conductive polymer than the polyvalent anion derived from an oxidant.

The ratio of the monovalent anion to the mixed dopant depends greatly on the concentration of a surface active agent rather than on the concentration of an oxidant. Thus, the ratio can be appropriately controlled by changing the concentration of a surface active agent. Preferably, the ratio of the monovalent anion to the mixed dopant is in the range of 9 to 999:1.

The electric conductivity and its stability of a conductive polymer tend to be more improved when the ratio of the monovalent anion derived from the surface active agent is higher. Thus, the capacitor using the conductive polymer doped with the mixed dopant is remarkably improved in high frequency characteristics and loss characteristic over those using manganese dioxide or a conductive polymer doped only with a salt of a transition metal and a polyvalent acid.

The anionic surface active agents should preferably contain an anionic sulfonate group, more preferably an anionic aromatic sulfonate group.

When the chemical polymerization is effected, it is preferred to add phenolic compounds to the monomer solution or the polymerization system in an amount of 0.01 to 0.2 moles/liter of the monomer solution. The phenolic compound is not incorporated in the resulting conductive polymer as a dopant but contributes to improving the electric conductivity and its stability of the polymer. Presumably, this is because the phenolic compound serves to form a conductive polymer which has higher regularity and, thus, a more developed conjugate length. As a result, the capacitor using the conductive polymer obtained from a polymerization system to which phenolic compounds are added is improved in initial characteristics and stability thereof.

Examples of the phenolic compounds include phenol, nitrophenol, cyanophenol, hydroxybenzoic acid, hydroxyphenol, acetophenol and mixtures thereof.

The method of the invention may further comprise forming a manganese dioxide layer between the dielectric film and the conductive polymer layer. The formation of the manganese dioxide layer is well known in the art. For instance, the manganese dioxide layer may be formed by applying onto the dielectric film an aqueous solution of a manganese salt and thermally decomposing the salt at a temperature of 200° to 350° C. to form manganese dioxide layer in a thickness of 0.03 to 1 $\mu$m. Examples of such manganese salts include manganese nitrate, manganese acetate and the like water-soluble salts.

The manganese dioxide layer is relatively low in electric conductivity, and the presence of a thin manganese dioxide layer between the dielectric film and the conductive polymer layer is effective in reducing a leakage current which may increase by increasing a potential being applied to the capacitor.

The manganese dioxide layer may be formed on the dielectric film by reduction of a permanganate salt. Examples of such permanganate salt include sodium permanganate, potassium permanganate, lithium permanganate, and the like.

The method wherein the dielectric film made of a valve metal oxide has is formed has been mainly described hereinabove. The dielectric film may be formed by coating a solution of a dielectric polymer and drying the solution to form a thin polymer film. In the practice of the invention, it is preferred to form a thin polymer film by spin coating the solution. Such polymers include, for example, polyimides, polyacrylate, polyphenylene oxide, and the like, of which polyimides are preferred. The polyimide thin film can be formed, for example, by providing a dimethylformamide/methanol solution of polyamic acid, for example, of the following formula prepared from biphenyltetracarboxylic acid dihydrate and phenylenediamine, adding triethylamine to prepare a polyamic acid solution for electrodeposition, subjecting an aluminium anode to the electrodeposition in the solution to form a polyamic acid thin film on the anode, and thermally hydrolyzing the film at a high temperature of about 250° C. to obtain a polyimide thin film

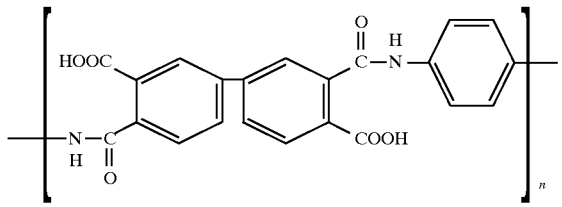

When a thin polymer film is formed as a dielectric film, either a valve metal film or a conductive polymer film may be used as the electrode 10 in FIG. 1A.

Where a valve metal is used as the electrode 10, a solution of a polymer is applied onto a valve metal foil or sheet or sintered body and dried to form a thin polymer film, followed by formation of a conductive polymer layer in a manner described above. As a matter of course, a valve metal foil or a sintered body of a valve metal may be partially or wholly immersed in such a polymer solution to cover the foil or body with a polymer layer, followed by further coverage of a conductive polymer layer on the dielectric thin polymer film. The thin polymer film is usually formed in a thickness of 0.05 to 3 μm.

Where the dielectric film 12 is made of a dielectric thin polymer film, the electrode 10 may be made of a conductive polymer film of the type used as the conductive polymer layer 14. In this case, the conductive polymer film is formed, for example, by the following manner. A conductive polymer film is first formed, for example, by electrolytic polymerization. Subsequently, a solution of a dielectric polymer is prepared and applied onto the thus prepared conductive polymer substrate serving as the electrode 10, followed by further formation of a conductive polymer layer 14 in a manner having set out hereinbefore. In this case, the conductive polymer film serving as the electrode 10 is formed in a thickness of 1 to 50 μm.

The formation of the single-layered conductive layer 14 made only of a polymer of pyrrole or its derivative has been described hereinabove.

When the conductive layer 14 is formed as a double-layered structure or a multi-layered structure as shown in FIG. 1B, the method of the invention further comprises, prior to the formation of the conductive polymer layer made of a polymer of pyrrole or its derivative, forming the conductive polymer layer 14b shown in FIG. 1B on the dielectric film wherein the conductive polymer layer 14b is made of a polymer of a thiophene derivative of the aforeindicated formula and doped with a monovalent anion. The conductive polymer layer 14b should preferably have a thickness of 0.02 to 1 μm.

The formation of the conductive polymer layer 14b is preferably conducted by chemical polymerization of the thiophene derivative monomer in a polymerization system comprising a monovalent anion. Such a monovalent anion is preferably a sulfonate group. More preferably, the sulfonate group is derived from an anionic surface active agent such as dodecylbenzenesulfonate, alkylnaphthalenesulfonate or the like. Like the single-layered structure, the polymerization system may further comprise a polyvalent anion along with the monovalent anion for the reason having set out before. Such polyvalent anions are those described with respect to the conductive polymer layer 14 and include those derived from salts of transition metals such as iron (III), copper (II), chromium (V), cerium (IV), ruthenium (III) and manganese (VII) and polyvalent acids such as sulfuric acid, phosphoric acid, permanganic acid, chromic acid, bichromic acid and the like. Of these, a sulfate anion is preferred. More particularly, the polymerization system should preferably contain ferric sulfate and an anionic surface active agent of the type defined with respect to the conductive polymer layer 14. In this case, fine precipitates consisting of ferric cation and the anion derived from an anionic surface active agent are temporarily formed on which the molecules of thiophene monomer are adsorbed and polymerized in situ. The polymerization reaction whose velocity is liable to delay can be accelerated.

In practice, the chemical polymerization is effected by dipping a dielectric film-bearing electrode 10 in a polymerization system comprising a thiophene derivative, an anionic surface active agent capable of yielding a monovalent sulfonate anion, and a sulfate capable of yielding a polyvalent anion, thereby forming a conductive polymer of the thiophene derivative doped with a mixed dopant. Alternatively, the chemical polymerization may be effected by immersing the electrode 10 in a monomer solution comprising a thiophene derivative and an anionic surface active agent, and further immersing in an oxidant solution comprising a compound capable of yielding a polyvalent anion. The chemical polymerization may be effected substantially in the same manner as described with reference to the single-layered structure but it is usual not to repeat the immersion steps but keep the electrode in the polymerization system or in the oxidant solution to form a conductive polymer of a thiophene derivative. The polymerization system is preferably an aqueous system.

In the chemical polymerization system, phenol or its derivative may be contained in amounts which have been described with regard to the single-layered structure. Examples of such phenolic compounds include phenol, nitrophenol, cyanophenol, hydroxybenzoic acid, hydroxyphenol, acetophenol and mixtures thereof.

Alternatively, the conductive layer 14b may also be formed by dipping a dielectric film-bearing electrode 10 in a solution of a conductive polymer of the thiophene derivative, which has been prepared separately such as by electrolytic polymerization or oxidation polymerization. In this case, polystyrenesulfonate may be used as a dopant, aside from the anionic surface active agent defined before.

Thereafter, the conductive polymer layer 14a of pyrrole or its derivative is formed in a manner as having set out with respect to the single-layered conductive polymer layer 14 preferably by chemical polymerization. Alternatively, the conductive polymer layer 14a may be formed by electrolytic polymerization after the formation of the conductive polymer layer 14b. In the electrolytic polymerization procedure, such a polymerization system comprising a monomer of pyrrole or its derivative, a monovalent anion and a polyvalent anion is subjected to polymerization reaction by applying a DV potential of about 2.5 V in an aqueous medium wherein the capacitor unit is used as an anode for the electrolytic polymerization, thereby forming the conductive polymer layer 14b.

When the electrolytic polymerization is effected, it is preferred to use an aqueous medium comprising electrolytes such as sulfonates, perchlorates, tetrafluoroborates and the like. In the case, phenolic compounds as mentioned before are preferably added in amounts defined before, with similar results being expected.

The conductive polymer layer 14b which is formed in addition to the conductive polymer layer 14a is advantageous in that because a thiophene derivative monomer is lower in polymerization rate than pyrrole or its derivative, the monomer is polymerized after infiltration into deeper sites, e.g. etched pits or fine pores, of an etched foil or a porous sintered body of a valve metal. Accordingly, a solid electrolytic capacitor which has a high capacitance can be more readily obtained than in the case using a single-layered structure-type conductive polymer layer made of pyrrole or its derivative polymer.

This method is irrespective of whether or not the electrode 10 is made of a valve metal or a conductive polymer.

Further, the conductive polymer layer 14c may be further formed on a side of the conductive polymer layer 14a opposite to that on which the conductive polymer layer 14b has been formed. By this, the built-up conductive polymer layer is reliably formed, thereby stably improving the capacitor characteristics and a heat resistance.

This conductive polymer layer 14c can be formed just like the conductive polymer layer 14b. More particularly, the layer 14c may be formed by chemical polymerization or electrolytic polymerization in a manner as having set out with regard to the layer 14b or may be formed by dipping in a conductive polymer solution. Especially, when the layer 14a made of a conductive polymer of pyrrole or its derivative is formed by chemical polymerization, the conductive layer 14c is preferably formed by the dipping or immersion.

The invention is more particularly described by way of examples. Comparative examples are also described.

EXAMPLE 1

A tantalum sintered body having a size of 2 mm×1.4 mm×0.9 mm was immersed in a solution of 5 ml of phosphoric acid in 1000 ml of water and anodized under conditions of a potential of 40 V and a temperature of about 90° C. to form a dielectric oxide film thereon.

This arrangement was regarded as a capacitor and subjected to measurement of a capacitance in the solution for the anodization treatment, revealing that the capacitance was 17 $\mu$F.

The thus anodized body was immersed in an aqueous monomer solution comprising 0.75 moles/liter of pyrrole monomer and 0.75 wt% of a sodium alkylnaphthalenesulfonate surface active agent (average molecular weight: 338) for 5 minutes, followed by further immersion in an oxidant solution containing 0.75 moles/liter of ferric sulfate and 0.75 wt% of such a surface active agent as used above for 10 minutes.

The above procedure was repeated 20 times to form a polypyrrole conductive layer doped with the divalent sulfate ions and the monovalent alkylnaphthalenesulfonate ions in a thickness of 10 $\mu$m.

Figure 2:
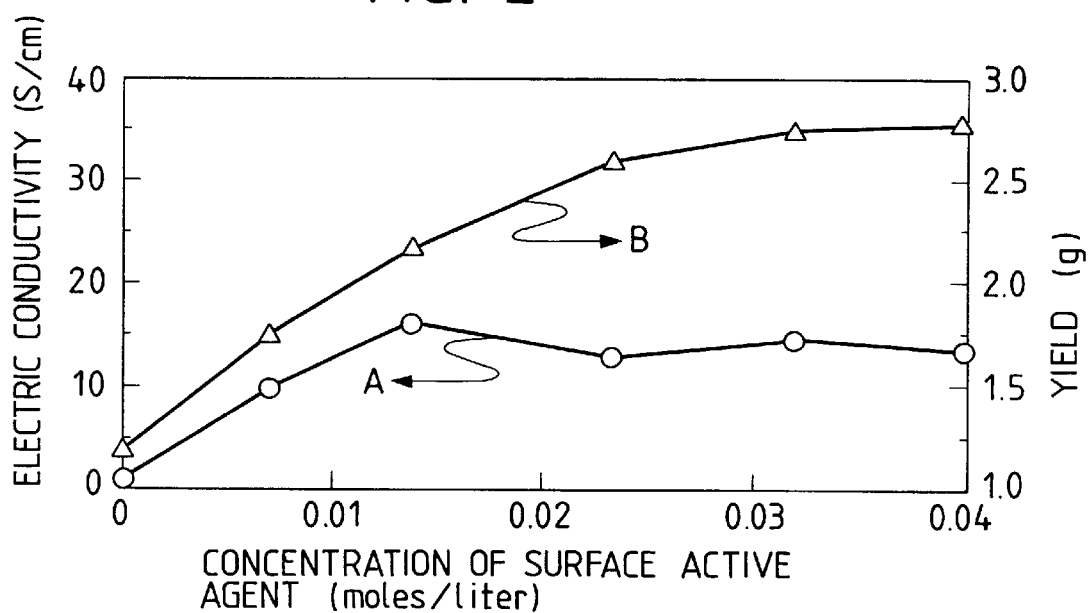
FIG. 2 is a graphical representation showing the electric conductivity and the yield of conductive polypyrrole in relation to the variation in amount of an anionic surface active agent in the polypyrrole.

FIG. 2 shows the electric conductivity and the yield in relation to the variation in concentration of the surface active agent when using a polymerization system comprising 0.375 moles of pyrrole monomer, 0.1 mole/liter of ferric sulfate and 200 ml of an aqueous medium with different amounts of the surface active agent. In the figure, curve A indicates the electric conductivity and curve B indicates the yield of the doped polypyrrole.

The results of FIG. 2 reveals that the electric conductivity and yield of the polypyrrole increased by increasing the amount of the surface active agent, giving evidence that the monovalent alkylnaphthalenesulfonate ions were doped in the polymer.

The elemental analysis revealed that the polymer product was substantially free of any iron ions and that the ratio of sulfur and nitrogen increased with an increasing concentration of the surface active agent.

The monovalent sulfonate ions from the surface active agent and the divalent sulfate ions were competitively taken in the polymer as a mixed dopant. On the assumption that the total doping rate did not change depending on the polymerization conditions, the doping ratio between both types of dopants could have been calculated from the results of the elemental analysis. In case where the polymerization was carried out using such a composition as used to make the capacitor, the molar ratio between the sulfate ions and the alkylnaphthalenesulfonate ions in the polypyrrole was found to be 1:29.

The tantalum sintered body on which the conductive polypyrrole layer had been formed was further formed with a carbon layer and a silver paint layer thereon as an apparent cathode, on which a lead was attached. In this manner, ten capacitor units were made.

Each unit was fully covered with an epoxy resin and aged by application of a voltage of 13 V under conditions of a temperature of 125° C. and a time of 1 hour to complete a capacitor.

Ten capacitors were subjected to measurements of a capacitance and a loss at 1 kHz and an impedance at 400 kHz. Moreover, each capacitor was subjected to a heat-resistant test under load by application of 10 V at 125° C. over 1000 hours, after which its variation in capacitance and the loss factor were measured. The average values of these measurements are shown in Table 1 below.

TABLE 1

| | Initial Characteristics | | | After 1000 hrs. of a Heat-resistant Test under Load | |
|---|---|---|---|---|---|
| | Capacitance ($\mu$F) | Loss factor (%) | Impedance ($\Omega$) | Variation in Capacitance (%) | Loss Factor (%) |
| Example 1 | 16.6 | 2.9 | 0.78 | −2.3 | 3.8 |
| Comp. Ex. 1 | 4.8 | 25 | 55 | — | — |
| Example 2 | 16.3 | 2.7 | 0.75 | −3.0 | 4.1 |
| Example 3 | 4.65 | 1.7 | 0.15 | −2.0 | 2.3 |
| Example 4 | 0.021 | 1.2 | 12 | — | — |
| Example 5 | 16.5 | 2.4 | 0.65 | −1.2 | 2.6 |
| Example 6 | | | | | |
| (A) | 16.4 | 2.6 | 0.68 | −1.6 | 3.1 |
| (B) | 16.7 | 2.5 | 0.72 | −1.9 | 3.2 |
| (C) | 16.5 | 2.7 | 0.73 | −1.8 | 3.3 |
| (D) | 16.7 | 2.5 | 0.69 | 02.0 | 3.0 |
| Example 7 | 16.4 | 3.2 | 0.84 | −3.5 | 3.9 |
| Example 8 | 16.9 | 3.5 | 0.89 | — | — |

Comparative Example 1

For comparison, the general procedure of Example 1 was repeated without use of any sodium alkylnaphthalenesulfonate, thereby obtaining ten capacitors.

These capacitors were each subjected to measurements of a capacitance and a loss factor at 1 kHz and an impedance at 400 kHz. The average values of these measurements are shown in Table 1.

EXAMPLE 2

The general procedure of Example 1 was repeated using sodium dodecylbenzenesulfonate in place of sodium alkylnaphthalenesulfonate, thereby obtaining 10 capacitors. These capacitors were each subjected to measurements of a capacitance and a loss factor at 1 kHz and an impedance at 400 kHz. Moreover, the variation in capacitance and the loss factor of each capacitor were measured after a loaded heat-resistant test made under conditions of 125° C. by application of 10 V. The average values of these measurements are shown in Table 1.

As will be apparent from the results of Table 1, when sodium dodecylbenzenesulfonate was added to the polymerization system, the penetration of the solution into the sintered body was enhanced as in the case using sodium alkylnaphthalenesulfonate. The resultant polypyrrole conductive layer was found to be doped with the monovalent dodecylbenzenesulfonate ions as partial substitution of the divalent sulfate ions.

The thus doped polypyrrole had better electric conductivity and thermal stability than the polypyrrole of Comparative Example 1 doped only with the sulfate ions.

Thus, there could be obtained capacitors which had a high capacitance, a low loss and a good high frequency impedance with a good heat resistance.

EXAMPLE 3

The general procedure of Example 1 was repeated using an etched aluminium foil electrode in place of the tantalum sintered body, thereby obtaining ten capacitors. These capacitors were subjected to measurements of characteristic properties in the same manner as in Example 1 with the results shown in Table 1.

It will be noted that the aluminium foil electrode was made in the following manner.

An aluminium etched foil having a size of 4 mm×10 mm was partitioned by attachment with a 1 mm wide polyimide tape on opposite sides thereof to make a 3 mm long portion and a 6 mm long portion separated with the polyimide tape.

An anode lead was attached to the 4 mm wide×3 mm long portion of the aluminium etched foil. The other portion which was 4 mm wide×6 mm long in size was immersed in an aqueous 3% ammonium adipate solution and anodized at about 70° C. by application of 50V to form a dielectric oxide film thereon.

This arrangement was regarded as a capacitor and subjected to measurement of a capacitance in the anodization solution, revealing that the capacitance was 4.75 $\mu$F.

As will be apparent from the results of Example 3 in Table 1, the electric conductivity and thermal stability of the resultant polypyrrole were better than those in Comparative Example 1 using the sulfate ions alone.

EXAMPLE 4

The general procedure of Example 3 was repeated except that an aluminium foil having a smooth surface and a size of 20 mm×20 mm was used without any partition thereon and a 0.5 $\mu$m thick polyimide thin film was formed by spin coating without formation of any dielectric oxide film, thereby obtaining 10 capacitors.

These capacitors were evaluated in the same manner as in Example 3, with the results shown in Table 1.

As will be apparent from Table 1, the electric conductivity and thermal stability of the resultant polypyrrole were better than those in Comparative Example 1 using the sulfate ions alone. Thus, when using the polyimide dielectric film, there can be obtained capacitors which exhibit a low loss and a good high frequency impedance characteristic.

EXAMPLE 5

The general procedure of Example 1 was repeated except that 0.1 mole/liter of p-nitrophenol was further added to the monomer solution, thereby obtaining ten capacitors. These capacitors were each subjected to measurements of a capacitance and a loss factor at 1 kHz and an impedance at 400 kHz. Moreover, the variation in capacitance and the loss factor of each capacitor were measured after a loaded heat-resistant test performed under conditions of 125° C. by application of 10 V. The average values of these measurements are shown in Table 1.

Further, a polymerization system comprising 0.375 moles/liter of pyrrole monomer, 0.1 mole/liter of ferric sulfate and 0.05 moles/liter of p-nitrophenol and 200 ml of an aqueous medium was mixed with different amounts of sodium alkylnaphthalenesulfonate to determine the electric conductivity and the yield in relation to the variation in the amount of the surface active agent. The results are shown in FIG. 3 wherein curve A is for the electric conductivity and curve B is for the yield.

Figure 3:
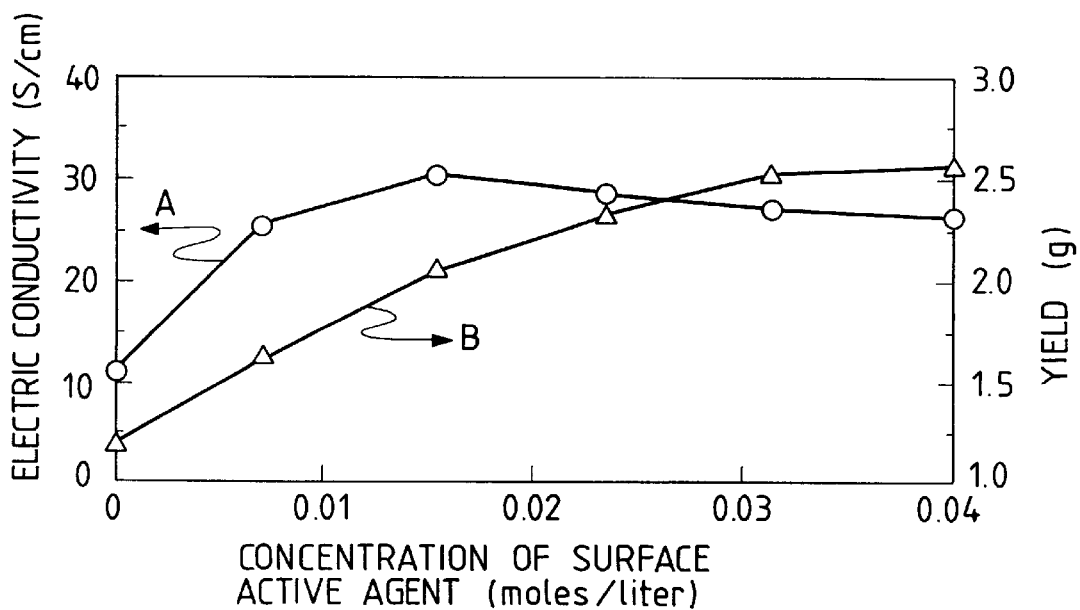
FIG. 3 is a graph similar to that shown in FIG. 2 but using a different type of monomer composition.

The comparison between FIGS. 2 and 3 reveals that the electric conductivity is improved over the case wherein p-nitrophenol was not added to at all.

The elemental analysis reveals that substantially no change was found in the composition of the resultant polypyrrole by the addition of p-nitrophenol, giving evidence that the nitrophenol was not taken in as the dopant.

As will be apparent from Table 1, the electric conductivity was found to be more improved, and the resultant capacitor was high in capacitance, low in loss and excellent in high frequency impedance characteristic.

EXAMPLE 6

The general procedure of Example 5 was repeated using, in place of p-nitrophenol, p-cyanophenol (A), m-hydroxybenzoic acid (B), m-hydroxyphenol (C), and acetophenol (D), thereby obtaining ten capacitors for each phenol.

These capacitors were each subjected to measurements of a capacitance and a loss factor at 1 kHz and an impedance at 400 kHz. Moreover, the variation in capacitance and the loss factor of each capacitor were measured after a loaded heat-resistant test performed under conditions of 125° C. by application of 10 V. The average values of these measurements are shown in Table 1.

Since the phenolic derivatives are, respectively, added to the polymerization solution along with the anionic surface active agent, the solution is more likely to be infiltrated into the fine pores of the sintered body in which the polymerization takes place. Moreover, the monovalent anion is doped as being substituted with part of the divalent sulfate ions, thereby leading to a conductive polypyrrole with a more improved electric conductivity.

The electric conductivity of the polypyrrole is better than that of a conductive polymer doped only with sulfate ions in Comparative Example 1 along with better thermal stability.

EXAMPLE 7

The general procedure of Example 1 was repeated using cupric sulfate in place of ferric sulfate at the same concentration, thereby obtaining 10 capacitors. These capacitors were each subjected to measurements of a capacitance and a loss factor at 1 kHz and an impedance at 400 kHz. Moreover, the variation in capacitance and the loss factor of each capacitor were measured after a loaded heat-resistant test performed under conditions of 125° C. by application of 10 V. The average values of these measurements are shown in Table 1.

Like the foregoing examples, good capacitor characteristics including a capacitance, a loss factor and a high frequency impedance were attained along with a good heat resistance.

EXAMPLE 8

The general procedure of Example 1 was repeated except that after the anodization, the tantalum sintered body was immersed in an aqueous 30% manganese nitrate solution and thermally decomposed at 250° C. to form a manganese dioxide layer in a thickness of 0.03 μm on the dielectric film, thereby obtaining ten capacitors.

These capacitors were each subjected to measurements of a capacitance and a loss factor at 1 kHz and an impedance at 400 kHz. The average values of these measurements are shown in Table 1.

When a rated potential of 10 V was applied to the capacitor, its leakage current was found to be 2.8 nA. When measured under the same conditions as set out above, the leakage current of the capacitor of Example 1 was found to be 3.1 nA. Thus, both capacitors were substantially at the same level in leakage current and exhibited a very low leakage current characteristic.

Both capacitors used above were further subjected to measurement of leakage current while changing the applied voltage from 1 to 16V. As a result, it was found that, in both capacitors, the logarithmic values of the leakage current were, respectively, proportional to the half power of the applied voltage, i.e. the value of (applied voltage)$^{1/2}$, but with a gradient of 0.93 in the capacitor of this example, which is smaller than a gradient of 1.13 in Example 1.

This is considered to result from the presence of the manganese dioxide layer which has a relatively low electric conductivity and is provided between the dielectric layer and the conductive polypyrrole. From this, it will be expected that the capacitor is prevented from short-circuiting on application of too high a voltage.

As will be apparent from the results of Example 8 in Table 1, the loss factor increases only slightly owing to the presence of the manganese dioxide layer. Presumably, this is because the manganese dioxide layer was very thin.

EXAMPLE 9

The general procedure of Example 3 was repeated except that after the formation of the anodized oxide film on the foil electrode, the foil was immersed in an aqueous 12% sodium permanganate solution, followed by immersion in a solution comprising pyrrole monomer and sodium alkylnaphthalenesulfonate to form a reduced manganese dioxide layer, thereby obtaining capacitors.

Like Example 8, the increasing rate of a leakage current relative to an applied voltage tends to be reduced over the case using the pyrrole layer alone without formation of any manganese dioxide layer.

EXAMPLE 10

A tantalum sintered body having a size of 2×1.4×0.9 mm was provided and anodized in a solution of 5 ml of phosphoric acid in 1000 ml of water at a temperature of about 90° C. by application of 40 V thereby forming a dielectric oxide film thereon.

This arrangement was regarded as a capacitor and subjected to measurement of a capacitance in the solution, revealing that the capacitance was 17 μF.

This body was immersed in a monomer solution comprising 5 g of pyrrole monomer, 1.6 g of sodium alkylnaphthalenesulfonate (average molecular weight of 338), 90 g of water and 10 g of ethanol, followed by further immersion in an oxidant solution comprising 7.9 g of ferric sulfate hydrate (with a water content of 74%), 1.6 g of the surface active agent of the type used above, and 90 g of water and 10 g of ethanol.

The above procedures were repeated until a conductive layer made of polypyrrole doped with divalent sulfate ions and monovalent alkylnaphthalenesulfonate ions was formed. Fifteen repetition cycles were necessary to reliably form the conductive layer.

Figure 4:
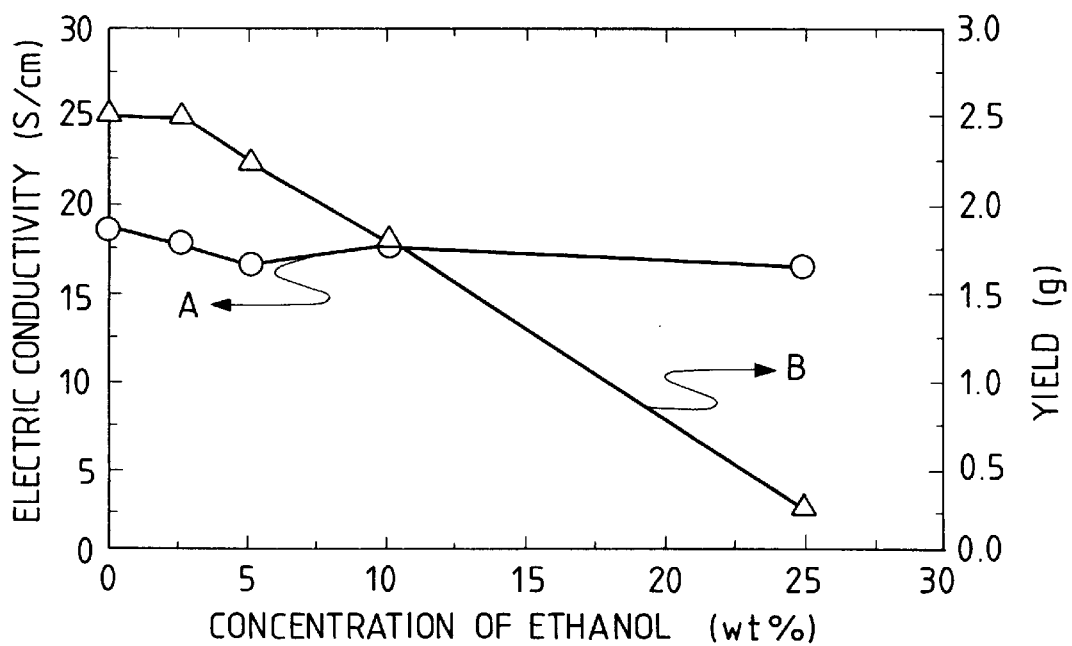
FIG. 4 is a graph showing the electric conductivity and the yield in relation to the variation in amount of ethanol in a monomer solution.

FIG. 4 shows the electric conductivity and the yield of the doped polypyrrole obtained by polymerization at 25° C. for 15 minutes in relation to the variation in content of ethanol in the medium composed of water and ethanol. In FIG. 4, curve A is for the electric conductivity and curve B is for the yield.

As shown in FIG. 4, the yield of the polypyrrole decreases depending of the concentration of ethanol in the medium. On the other hand, little change took place in the electric conductivity when the concentration of ethanol changed.

Figure 5:
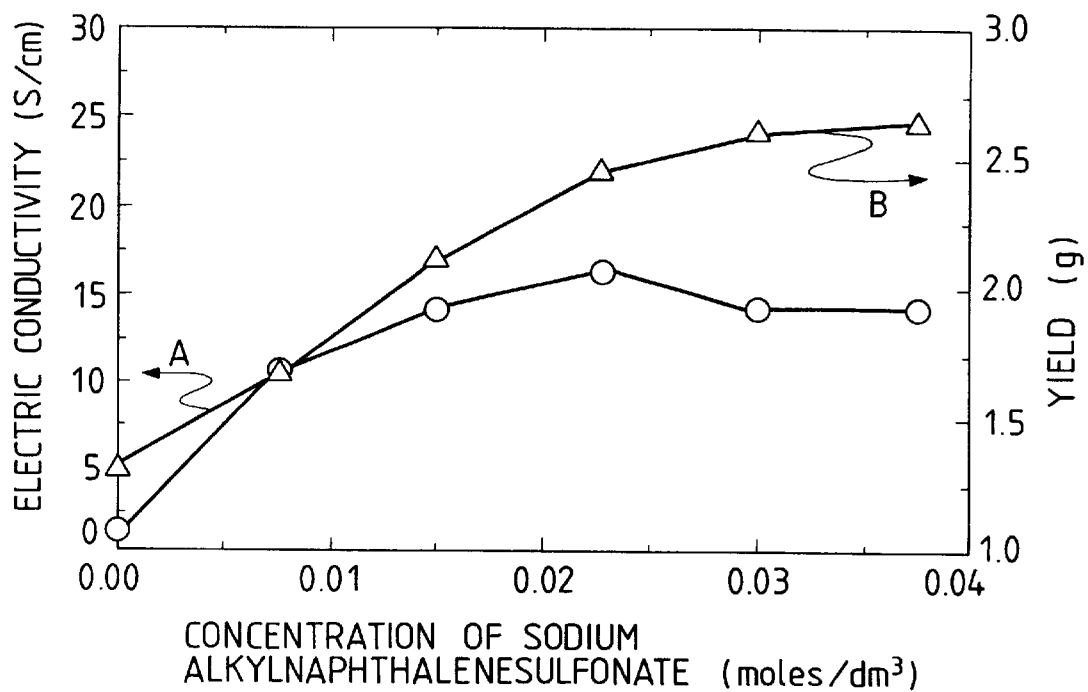
FIG. 5 is a graph showing the electric conductivity and the yield in relation to the variation in amount of sodium alkylnaphthalenesulfonate in a monomer solution.

FIG. 5 shows the electric conductivity and the yield of polypyrrole obtained by polymerization in a medium composed of 10% by weight of ethanol and the balance of water at 25° C. for 1 hour while changing the amount of sodium alkylnaphthalenesulfonate. In the figure, curve A is for the electric conductivity and curve B is for the yield.

As will be apparent from the figure, the addition of the surface active agent results in the increase in the yield and the electric conductivity of the polypyrrole, revealing that the monovalent alkylnaphthalenesulfonate ions are doped.

Figure 6:
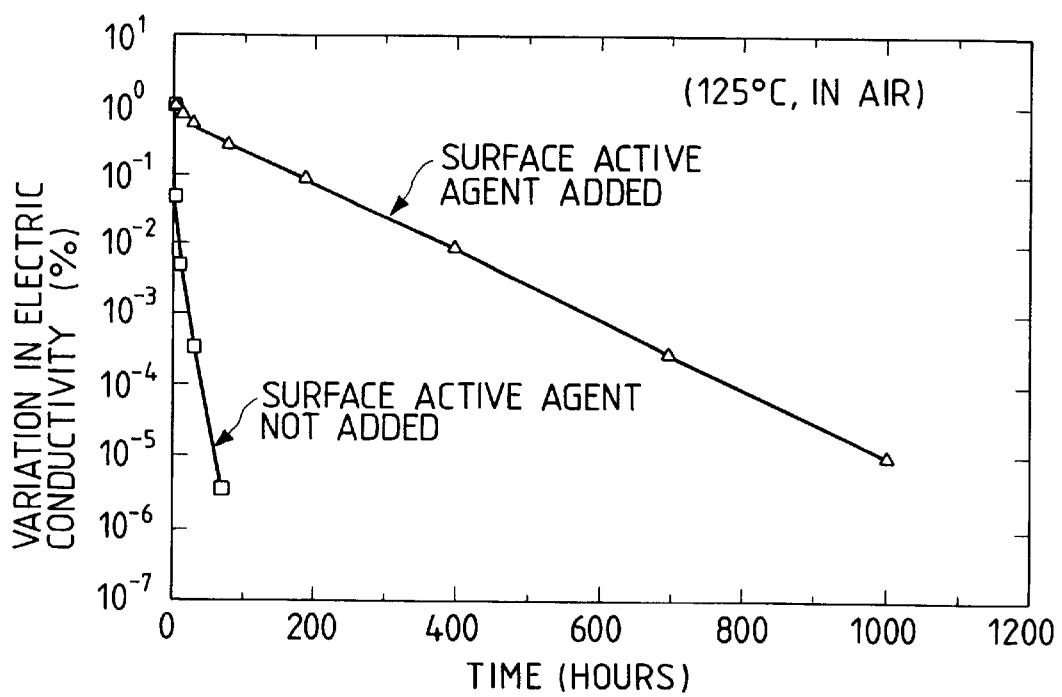
FIG. 6 is a graph showing the electric conductivity of polypyrrole with or without addition of sodium alkylnaphthalenesulfonate in a polymerization system in relation to the variation of time when the polypyrrole is maintained in air at 125° C.

FIG. 6 shows the influence of the sodium alkylnaphthalenesulfonate on the stability of electric conductivity when polypyrrole products with or without addition of sodium alkylnaphthalenesulfonate in the polymerization system were maintained in air at 125° C. The figure reveals that the electric conductivity of the polypyrrole obtained by addition of the surface active agent is drastically improved over that of the polypyrrole obtained without addition of any surface active agent.

Moreover, the elemental analysis of the doped pyrrole obtained in this example reveals that the pyrrole is substantially free of any iron and the ratio of sulfur and nitrogen in the polypyrrole increases with the increase of the yield.

The polypyrrole layer-bearing tantalum sintered body was further formed thereon with a carbon layer and a silver paint layer to form an apparent cathode on the conductive polypyrrole layer serving as a true cathode. A lead was attached to the cathode to obtain ten capacitor units.

Each unit was covered with an epoxy resin and aged at 125° C. by application of 13 V for 60 minutes to complete ten solid electrolytic capacitors.

These capacitors were each subjected to measurements of a capacitance and a loss factor at 1 kHz and an impedance at 400 kHz. Moreover, the variation in capacitance and the loss factor of each capacitor were measured after a loaded heat-resistant test performed under conditions of 125° C. by application of 10 V. The average values of these measurements are shown in Table 2.

TABLE 2

| | Initial Characteristics | | | After 1000 hrs. of a Heat-resistant Test under Load | |
|---|---|---|---|---|---|
| | Capacitance (μF) | Loss factor (%) | Impedance (Ω) | Variation in Capacitance (%) | Loss Factor (%) |
| Example 10 | 16.7 | 2.5 | 0.074 | −2.2 | 3.5 |
| Reference 1 | 14.2 | 2.6 | 0.088 | — | — |
| Comp. Ex. 2 | 9.7 | 19 | 3.4 | — | — |
| Example 11 | | | | | |
| (A) | 16.8 | 2.7 | 0.073 | −2.2 | 3.6 |
| (B) | 16.5 | 2.6 | 0.075 | −2.4 | 3.5 |
| (C) | 16.3 | 2.5 | 0.075 | −2.3 | 3.6 |
| (D) | 16.3 | 2.6 | 0.077 | −2.5 | 3.8 |
| (E) | 16.2 | 2.5 | 0.074 | −2.3 | 3.7 |
| Example 12 | 16.6 | 2.3 | 0.073 | −2.7 | 4.2 |
| Example 13 | 4.71 | 1.6 | 0.021 | −2.1 | 2.3 |
| Example 14 | 0.22 | 1.1 | 12 | — | — |
| Example 15 | 16.6 | 2.1 | 0.065 | −1.5 | 2.5 |
| Example 16 | | | | | |
| (A) | 16.7 | 2.2 | 0.067 | −1.5 | 2.6 |
| (B) | 16.5 | 2.2 | 0.066 | −1.7 | 2.7 |
| (C) | 16.4 | 2.3 | 0.067 | −1.9 | 2.8 |
| (D) | 16.5 | 2.2 | 0.065 | −1.8 | 2.7 |
| (E) | 16.4 | 2.2 | 0.067 | −1.7 | 2.7 |
| Example 17 | 16.5 | 2.9 | 0.078 | −3.0 | 4.1 |
| Example 18 | 16.8 | 3.1 | 0.088 | −2.4 | 3.8 |
| Example 19 | 16.5 | 3.2 | 0.092 | — | — |

Reference 1

For comparison, the general procedure of Example 10 was repeated except that ethanol was not added and water was used wholly as the polymerization medium, thereby obtaining ten capacitors. In this case, eleven repetition cycles of the polymerization step were necessary for the formation of the polypyrrole conductive layer.

These capacitors were each subjected to measurements of a capacitance and a loss factor at 1 kHz and an impedance at 400 kHz. The average values of these measurements are shown in Table 2.

Comparative Example 2

The general procedure of Example 10 was repeated without use of sodium alkylnaphthalenesulfonate, thereby obtaining 10 capacitors.

These capacitors were each subjected to measurements of a capacitance and a loss factor at 1 kHz and an impedance at 400 kHz. The average values of these measurements are shown in Table 2.

As will be apparent from Table 2, when ethanol was added to the polymerization system as in Example 10, the polymerization rate was appropriately delayed, so that the monomer was more likely to be infiltrated into the sintered body by the action of the sulfonate surface active agent, thereby permitting a polypyrrole layer to be formed to the depth of the fine pores of the sintered body or to the depth of etching pits of an etched aluminium foil. As in the foregoing examples, the monovalent anion was doped as being substituted with part of the sulfate ions in the polypyrrole conductive layer.

This is the reason why high capacitance capacitors were obtained in Example 10.

Moreover, the results of FIGS. 5 and 6 reveal that the electric conductivity and its stability of the polypyrrole of Example 10 are better than those of the polypyrrole obtained in Comparative Example 2 wherein sulfate ions alone were doped.

Thus, the capacitor of Example 10 is low in loss and excellent in high frequency impedance characteristic along with a good heat resistance.

From the results of Reference 1, it will be seen that since the polymerization reaction starts to proceed prior to the infiltration of the oxidant into the fine pores of the sintered body, the resultant capacitor exhibits a capacitance lower than that of Example 10 but the capacitance is sufficient for practical applications.

In order to attain such a high level of capacitance as in Example 10, it is effective to lower the concentrations of pyrrole monomer and an oxidant, but this may require a greater number of repetition cycles necessary for the formation of a polypyrrole conductive layer.

EXAMPLE 11

The general procedure of Example 10 was repeated using, in place of ethanol, methanol (A), n-propanol (B), ethylene glycol (C), propylene glycol (D), and glycerine (E), thereby obtaining ten capacitors for each alcohol. These capacitors were each subjected to measurements of a capacitance and a loss factor at 1 kHz and an impedance at 400 kHz. The average values of these measurements are shown in Table 2.

As will be apparent from the results of Example 11 in Table 2, when these alcohols are added to the polymerization medium, the polymerization rate is appropriately delayed. Of course, the use of the sulfonate surface active agent improves the capability of infiltration of the monomer into the sintered body, so that it becomes easy to form a conductive polypyrrole layer to the depth of the fine pores of the sintered body.

Thus, the capacitors of Example 11 exhibit a high capacitance, a low loss and a good high frequency impedance characteristic along with a good heat resistance.

EXAMPLE 12

The general procedure of Example 10 was repeated using 1.7 g of sodium dodecylbenzenesulfonate in place of the sodium alkylnaphthalenesulfonate, thereby obtaining ten capacitors. These capacitors were each subjected to measurements of a capacitance and a loss factor at 1 kHz and an impedance at 400 kHz. Moreover, the variation in capacitance and the loss factor of each capacitor were measured after a loaded heat-resistant test performed under conditions of 125° C. by application of 10 V. The average values of these measurements are shown in Table 2.

As will be apparent from Table 2, good results similar to those of Example 10 were obtained.

EXAMPLE 13

The general procedure of Example 10 was repeated using an etched aluminium foil electrode in place of the tantalum sintered body, thereby obtaining ten capacitors. These capacitors were evaluated in the same manner as in Example 10 with the results shown in Table 2.

The aluminium foil electrode was made in the following manner.

An aluminium etched foil having a size of 4 mm×10 mm was partitioned by attachment with a 1 mm wide polyimide tape on opposite sides thereof to make a 3 mm long portion and a 6 mm long portion through the polyimide tape.

An anode lead was attached to the 4 mm wide×3 mm long portion of the aluminium etched foil. The other portion which was 4 mm wide×6 mm long in size was immersed in an aqueous 3% ammonium adipate solution and anodized at about 70° C. by application of 50V to form a dielectric oxide film thereon.

This arrangement was regarded as a capacitor and subjected to measurement of a capacitance in the anodization solution, revealing that the capacitance was 4.75 $\mu$F.

As will be apparent from the results of Example 13 in Table 2, good results similar to those of Example 10 are obtained. More particularly, the conductive polypyrrole is better in electric conductivity and its stability than a conductive polypyrrole product doped only with sulfate ions. The resultant capacitor has a high capacitance, a low loss and a good high frequency impedance characteristic along with a good heat resistance.

EXAMPLE 14

The general procedure of Example 13 was repeated expect that an aluminium smooth foil having a size of 20 mm×20 mm was used and a 0.5 $\mu$m thick polyimide thin film was formed on the foil by spin coating, thereby obtaining ten capacitors. These capacitors were evaluated in the same manner as in Example 13, with good result shown in Table 2.

EXAMPLE 15

The general procedure of Example 10 was repeated except that 0.1 mole/liter of p-nitrophenol was added to the monomer solution, thereby obtaining ten capacitors. These capacitors were each subjected to measurements of a capacitance and a loss factor at 1 kHz and an impedance at 400 kHz. The average values of these measurements are shown in Table 2.

Since the p-nitrophenol was added, the electric conductivity is improved over the case wherein sulfate ions and alkylnaphthalenesulfonate ions are used but no p-nitrophenol is added to the polymerization system, with better thermal stability.

EXAMPLE 16

The general procedure of Example 15 was repeated using, in place of p-nitrophenol, m-nitrophenol (A), p-cyanophenol (B), m-hydroxybenzoic acid (C), m-hydroxyphenol (D) and acetophenol (E), thereby obtaining ten capacitors for each phenol.

These capacitors were each subjected to measurements of a capacitance and a loss factor at 1 kHz and an impedance at 400 kHz. Moreover, the variation in capacitance and the loss factor of each capacitor were measured after a loaded heat-resistant test performed under conditions of 125° C. by application of 10 V. The average values of these measurements are shown in Table 2.

As will be apparent from Table 2, good results similar to those of Example 15 were obtained by use of various types of phenols.

EXAMPLE 17

The general procedure of Example 10 was repeated using cupric sulfate in place of ferric sulfate, thereby obtaining ten capacitors. These capacitors were evaluated in the same manner as in Example 1, with the results shown in Table 2. The results reveal that similar results as in Example 10 were obtained.

EXAMPLE 18

The general procedure of Example 10 was repeated except that after completion of the anodization, the tantalum sintered body was immersed in an aqueous 30% manganese nitrate solution and thermally decomposed at 250° C. to form a 0.03 $\mu$m thick manganese dioxide layer on the dielectric film, thereby obtaining ten capacitors.

The capacitors were each subjected to measurements of a capacitance and a loss factor at 1 kHz and an impedance at 400 kHz. The average values of these measurements are shown in Table 2.

When a rated voltage of 10 V was applied to the capacitor, the leakage current was found to be 2.5 nA. The leakage current of the capacitor of Example 10 which was determined under the same conditions as used above was found to be 2.9 nA. Thus, both capacitors were substantially equal to each other with respect to the leakage current and exhibited a very low leakage current.

When both capacitors were subjected to measurement of leakage current while changing an applied voltage from 1 V to 16V, it was found that the logarithmic value of the leakage current of the respective capacitors was proportional to the half power of the applied voltage or the value of (applied voltage )$^{1/2}$, with the gradient in the capacitor of Example 18 being 0.95 which is smaller than 1.14 which is a gradient in the latter capacitor.

This is considered to result from the formation of the manganese dioxide layer having a relatively low electric conductivity. It will be expected when a high voltage is applied to the capacitor, short-circuiting can be suppressed.

As will be apparent from Table 2, the increase of the loss factor as will be caused by the formation of the manganese dioxide layer is only slight. This is owing to the formation of the manganese oxide layer which was very thin.

EXAMPLE 19

The general procedure of Example 13 was repeated except that after the formation of the anodized oxide film on the foil, the foil was immersed in an aqueous 12% sodium permanganate solution, followed by further immersion in a solution comprising pyrrole monomer and sodium alkylnaphthalenesulfonate to form a reduced manganese oxide layer, thereby obtaining ten capacitors.

Like Example 18, the increasing rate of the leakage current relative to an applied voltage tends to reduce over the case wherein no manganese dioxide layer is used.

In the foregoing examples, the concentration of an alcohol was 10%, a higher or lower concentration may also be used provided that a significant difference in capacitor characteristics develops. It should be noted that if the concentration of an alcohol is too low, there is substantially no difference in polymerization rate from that of the case using water alone as a polymerization medium. On the other hand, if too high a concentration, it takes a long time for the polymerization reaction, thus being poor in economy.

The transition metals used in the examples include iron (III) and copper (II), other types of transition metals having an oxidation-reduction potential capable of oxidizing pyrrole or its derivative. These other types of transition metals are those defined before.

In Examples 4 and 14, a polyimide was used as a dielectric polymer. Other types of polymers capable of forming a thin dielectric film can be used. Moreover, such a polymer film can be formed by spin coating on an aluminium smooth foil. Alternatively, a polymer film may be formed on an etched aluminium foil by electrodeposition. Thus, the formation of the polymer film is not critical in the practice of the invention.

As will be apparent from the foregoing examples, the use of anionic surface active agents contributes to improving the capability of infiltration of a monomer or an oxidant to attain a high capacitance capacitor. The doping of a monovalent anion having a large-sized molecule also contributes to improving the electric conductivity and its thermal stability of the resultant conductive polymer. This leads to a capacitor whose loss factor and impedance characteristic are excellent, along with a good heat resistance.

The formation of a manganese dioxide layer between a dielectric film and a conductive polymer layer is effective in improving the loss factor while keeping only a small loss factor.

In the foregoing examples, the conductive polymer layer having a single-layered structure has been described. A conductive polymer layer having a double-layered or multi-layered structure is particularly described

EXAMPLE 20

A tantalum sintered body having a size of 2 mm×1.4 mm×0.9 mm was immersed in a solution of 5 ml of phosphoric acid in 1000 ml of water and anodized under conditions of a potential of 40 V and a temperature of about 90° C. to form a dielectric oxide film thereon.

This arrangement was regarded as a capacitor and subjected to measurement of a capacitance in the anodization solution, revealing that the capacitance was 18.0 $\mu$F.

The thus anodized body was immersed in an aqueous monomer solution comprising 0.1 mole/liter of ethylenedioxythiophene (EDOT) monomer and 0.75 wt% of a sodium alkylnaphthalenesulfonate surface active agent (average molecular weight: 338) for 5 minutes, followed by further immersion in an oxidant solution containing 0.75 moles/liter of ferric sulfate for 60 minutes at 65° C.

EDOT used above was one commercially available from Bayer AG. of Germany although this compound could be prepared by a usual manner.

Only one cycle of the immersion procedure as set out above was carried out to form, on the dielectric film of the tantalum sintered body, a 0.5 $\mu$m thick conductive layer made of polyethylene dioxythiophene (PEDOT) doped with the divalent sulfate ions and the monovalent alkylnaphthalenesulfonate ions.

Figure 7:
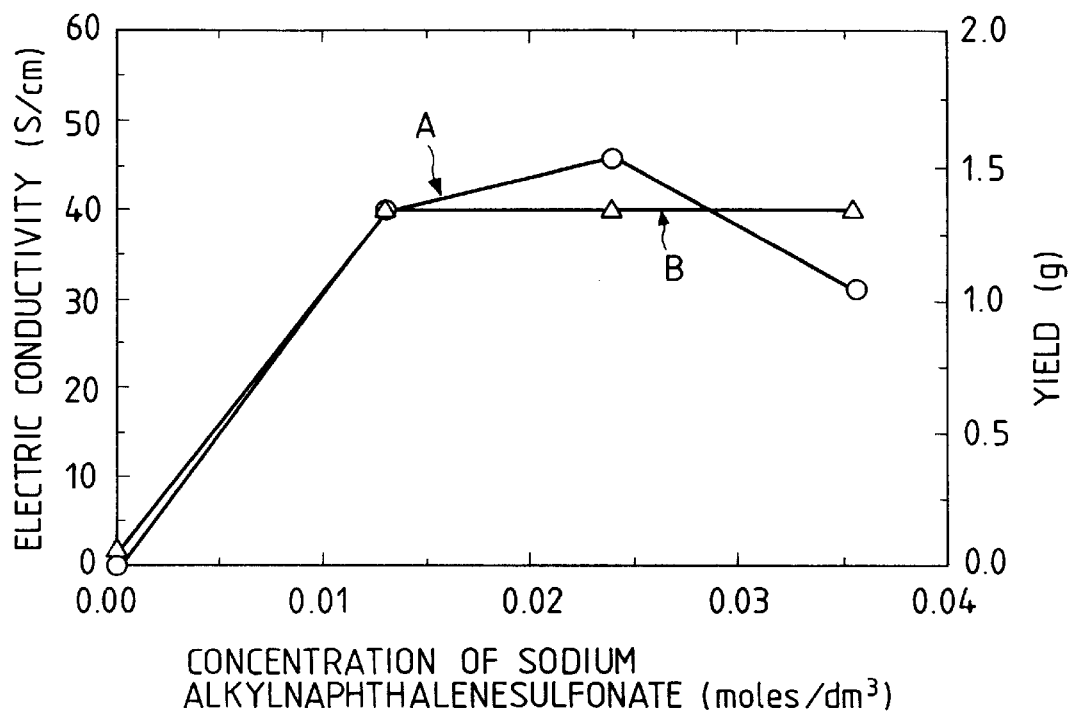
FIG. 7 is a graph showing the electric conductivity and the yield of a conductive polymer of ethylene dioxythiophene doped with sodium alkylnaphthalenesulfonate in relation to the variation in amount of the alkylnaphthalenesulfonate.

FIG. 7 shows the electric conductivity and the yield of PEDOT while changing the amount of sodium alkylnaphthalenesulfonate. PEDOT was prepared using a monomer solution comprising 0.05 moles of ethylenedioxyethiophene, 0.1 mole of $Fe_2(SO_4)_3$ and 200 ml of water as a polymerization medium under conditions of 45° C. and 20 hours while changing the amount of sodium alkylnaphthalenesulfonate. In the figure, curve A is for the electric conductivity and curve B is for the yield.

As will be seen from FIG. 7, the yield and the electric conductivity, respectively, increase by increasing the amount of sodium alkylnaphthalenesulfonate to a certain level.

This is considered owing to the doping of the monovalent alkylnaphthalenesulfonate anion in PEDOT.

When a sulfonate having no surface activity, e.g. 2-naphthalenesulfonate, was added, the yield and the electric conductivity of PEDOT were not increased as in the above case.

Accordingly, it was found that the addition of surface active sulfonates significantly increase the polymerization rate and the yield.

Moreover, the elemental analysis of PEDOT obtained in this example reveals that the product is substantially free of any iron component.

Thereafter, the PEDOT layer-bearing tantalum sintered body was immersed in a monomer aqueous solution comprising 0.75 moles/liter of pyrrole monomer and 0.75 wt% of sodium alkylnaphthalenesulfonate (average molecular weight: 338) for 2 minutes, followed by further immersion in such an oxidant solution as used for the formation of PEDOT at 25° C. for 10 minutes.

This procedure was repeated 14 times to form a polypyrrole conductive layer doped with the divalent sulfate ions and the monovalent alkylnaphthalenesulfonate ions.

Like PEDOT, the yield and the electric conductivity of the polypyrrole increased by gradual increase in amount of the sodium alkylnaphthalenesulfonate. This is considered to result from the doping of the monovalent sodium alkylnaphthalenesulfonate in the polypyrrole.

Where a sulfonate having no surface activity, i.e. 2-naphthalenesulfonate, was used in place of the sodium alkylnaphthalenesulfonate, the yield of polypyrrole did not increase to such an extent as in the case using the sodium alkylnaphthalenesulfonate.

Thus, the sulfonate having the surface activity is effective in increasing both the polymerization rate and the yield not only with PEDOT, but also with polypyrrole.

The elemental analysis of the polypyrrole reveals that the product is substantially free of any iron component.

The polypyrrole layer was then attached with a carbon layer and a silver paint layer to form an apparent cathode, on which a lead was attached to obtain ten capacitor units.

The capacitor units were each covered with an epoxy resin and aged at 125° C. by application of 13V to complete capacitors.

These capacitors were subjected to measurements of a capacitance and a loss at 1 kHz and an impedance at 400 kHz. Moreover, each capacitor was subjected to a loaded heat-resistant test by application of 10 V at 125° C. over 1000 hours, after which its variation in capacitance and the loss factor were measured. The average values of these measurements are shown in Table 3 below.

TABLE 3

| | Initial Characteristics | | | After 1000 hrs. of a Heat-resistant Test under Load | |
| --- | --- | --- | --- | --- | --- |
| | Capacitance ($\mu$F) | Loss factor (%) | Impedance ($\Omega$) | Variation in Capacitance (%) | Loss Factor (%) |
| Example 20 | 17.6 | 2.7 | 0.075 | −3.3 | 3.4 |
| Example 21 | 17.3 | 2.9 | 0.083 | −3.2 | 3.7 |
| Comp. Ex. 3 | 17.4 | 2.6 | 0.073 | −3.4 | 3.5 |
| Comp. Ex. 4 | 8.1 | 6.5 | 0.41 | −74 | 45 |
| Reference 2 | 16.7 | 2.8 | 0.082 | −3.5 | 3.8 |
| Example 22 | 17.7 | 2.7 | 0.073 | −3.6 | 3.8 |
| Example 23 | 4.88 | 2.5 | 0.20 | −3.8 | 3.2 |
| Comp. Ex. 5 | 4.84 | 2.3 | 0.19 | −3.3 | 2.8 |
| Comp. Ex. 6 | 2.62 | 6.3 | 0.98 | −8.2 | 5.3 |
| Reference 3 | 4.28 | 2.5 | 0.22 | −3.5 | 3.1 |
| Example 24 | 0.0220 | 1.3 | 3.9 | −4.0 | 2.2 |
| Comp. Ex. 7 | 0.0223 | 1.1 | 3.8 | −3.8 | 2.5 |
| Comp. Ex. 8 | 0.0218 | 3.4 | 15.2 | −4.5 | 48 |
| Example 25 | 17.7 | 2.4 | 0.069 | −2.8 | 3.1 |
| Example 26 | | | | | |
| (A) | 17.5 | 2.5 | 0.070 | −3.0 | 2.9 |

TABLE 3-continued

|  | Initial Characteristics | | | After 1000 hrs. of a Heat-resistant Test under Load | |
|---|---|---|---|---|---|
|  | Capacitance (μF) | Loss factor (%) | Impedance (Ω) | Variation in Capacitance (%) | Loss Factor (%) |
| (B) | 17.6 | 2.5 | 0.072 | −3.3 | 3.1 |
| (C) | 17.4 | 2.4 | 0.071 | −3.5 | 2.9 |
| (D) | 17.6 | 2.4 | 0.072 | −2.9 | 3.0 |
| Example 27 | 17.5 | 3.5 | 0.088 | −4.5 | 3.9 |
| Example 28 | 4.87 | 2.3 | 0.18 | −3.7 | 2.9 |
| Reference 4 | 4.23 | 2.8 | 0.28 | −3.9 | 3.5 |
| Comp. Ex. 9 | 3.54 | 3.3 | 0.35 | −75 | 80 |
| Example 29 | 4.89 | 1.9 | 0.17 | −3.1 | 2.4 |
| Example 30 | 17.2 | 3.2 | 0.087 | −4.2 | 4.2 |
| Example 31 | 17.5 | 3.2 | 0.084 | −4.6 | 3.9 |

EXAMPLE 21

The general procedure of Example 20 was repeated using, in place of EDOT, 3,4-(1,2-propylene)dioxythiophene (PDOT), thereby forming a conductive poly(3,4-(1,2-propylene)dioxythiophene) (PPDOT), thereby obtaining ten capacitor.

These capacitors were subjected to measurements of a capacitance and a loss at 1 kHz and an impedance at 400 kHz. Moreover, each capacitor was subjected to a loaded heat-resistant test by application of 10 V at 125° C. over 1000 hours, after which its variation in capacitance and the loss factor were measured. The average values of these measurements are shown in Table 3.

As will be apparent from Table 3, similar results as in Example 20 were obtained with respect to the capacitor characteristics and the heat resistance.

In this example, the conductive PPDOT layer having similar physical properties as the PEDOT layer was formed to provide a composite layer with the polypyrrole layer, and the monovalent anion having the surface activity was doped in the PPDOT layer by partial substitution with the divalent sulfate ions. Thus, good capacitor characteristics and heat resistance were attained. The capacitor had a high capacitance, a low loss factor, a good high frequency impedance along with a good heat resistance.

Similar results were obtained when using other types of thiophene derivatives, i.e. 3,4-(1,2-propylenedioxy)thiophene and 3,4-(2,3-butylenedioxy)thiophene.

Comparative Example 3

The general procedure of Example 20 was repeated without formation of any polypyrrole layer but wherein the procedure of forming the PEDOT layer was repeated, thereby ten capacitors.

The procedure was repeated 30 times to form the PEDOT layer in a thickness of 10 μm.

These capacitors were subjected to measurements of a capacitance and a loss at 1 kHz and an impedance at 400 kHz. Moreover, each capacitor was subjected to a loaded heat-resistant test by application of 10 V at 125° C. over 1000 hours, after which its variation in capacitance and the loss factor were measured. The average values of these measurements are shown in Table 3.

The comparison between the results of Example 20 and this comparative example reveals that the capacitor characteristics and the heat resistance are similar to each other, but the a greater number of repeated procedures are necessary for the formation of the conductive layer. More particularly, in order to ensure capacitor characteristics and the durability similar to those of Example 20, a longer time is necessary for the formation of the conductive layer, thus being unsatisfactory in practical applications.

Thus, it was confirmed that the composite layer composed of the PEDOT layer and the polypyrrole is effective in efficiently manufacturing a capacitor having good capacitor characteristics and a good heat resistance.

Comparative Example 4

The general procedure of Example 20 was repeated without use of any sodium alkylnaphthalenesulfonate in both PEDOT and polypyrrole layers, thereby obtaining ten capacitors.

These capacitors were subjected to measurements of a capacitance and a loss at 1 kHz and an impedance at 400 kHz. Moreover, each capacitor was subjected to a loaded heat-resistant test by application of 10 V at 125° C. over 1000 hours, after which its variation in capacitance and the loss factor were measured. The average values of these measurements are shown in Table 3.

The comparison between the results of Example 20 and this comparative example reveals that the capacitor characteristics and the heat resistance of the capacitor of the comparative example were much poorer than those of Example 20.

This is considered for the reason that both PEDOT and polypyrrole layers are not doped with the bulky monovalent alkylnaphthalenesulfonate ions.

In Example 20, sodium alkylnaphthalenesulfonate serving as a surface active agent is used, so that the resultant capacitor is much better than the capacitor of Comparative Example 4 making use of no surface active agent with respect to the capacitor characteristics and the heat resistance.

In this comparative example, sodium alkylnaphthalenesulfonate was not used. Especially, with the resultant PEDOT layer, this layer was formed only to an extent that the layer was not visually observed on the dielectric film. More particularly, the PEDOT layer was not so formed as to improve the capacitor characteristics and the heat resistance.

The use of the monovalent alkylnaphthalenesulfonate ions improves not only the yield and the electric conductivity of both the PEDOT layer and the polypyrrole layer, but also the capacitor characteristics and the heat resistance.

Reference 2

The general procedure of Example 20 was repeated without formation of any PEDOT layer but with the polypyrrole layer being formed under the same conditions as in Example 20, thereby obtaining ten capacitors.

These capacitors were subjected to measurements of a capacitance and a loss at 1 kHz and an impedance at 400 kHz. Moreover, each capacitor was subjected to a loaded heat-resistant test by application of 10 V at 125° C. over 1000 hours, after which its variation in capacitance and the loss factor were measured. The average values of these measurements are shown in Table 3.

The comparison between Example 20 and Reference 2 reveals that the capacitance tends to be smaller in Reference 2. This is considered for the reason: because the polymerization rate of pyrrole is so great that the monomer starts to polymerize prior to arrival at the inside of the fine pores in the sintered body, thereby clogging part of the fine pores with the resultant polypyrrole.

In contrast, although sodium alkylnaphthalenesulfonate serving as a surface active agent is contained in the EDOT monomer solution to increase the polymerization rate of EDOT, its rate is lower than that of pyrrole. This enables the EDOT monomer to be infiltrated to deeper sites in the sintered body, in which PEDOT is formed. Thus, a higher capacitance is realized.

Using the composite conductive layer including a conductive PEDOT layer and a conductive polypyrrole layer, the resultant capacitor which is better in capacitor characteristics and heat resistance can be efficiently fabricated.

When the PEDOT layer is formed directly on the dielectric film as in Example 20, the polymer is formed as being infiltrated into deeper sites in the sintered body having the dielectric film thereon without clogging the fine pores therewith. The resultant capacitor has an increased capacitance.

Similar results were obtained when using other types of thiophene derivatives indicated in Example 21 and the aromatic sulfonate surface active agent.

EXAMPLE 22

The general procedure of Example 20 was repeated except that sodium dodecylbenzenesulfonate was used in place of sodium alkylnaphthalenesulfonate, thereby obtaining ten capacitors.

These capacitors were subjected to measurements of a capacitance and a loss at 1 kHz and an impedance at 400 kHz. Moreover, each capacitor was subjected to a loaded heat-resistant test by application of 10 V at 125° C. over 1000 hours, after which its variation in capacitance and the loss factor were measured. The average values of these measurements are shown in Table 3.

The results of the table reveal that similar results as in Example 20 are obtained with respect to the capacitor characteristics and the heat resistance.

This is because the bulky dodecylbenzenesulfonate ions are doped in the PEDOT and polypyrrole layers by replacement with part of the divalent sulfate and serve as a surface active agent.

EXAMPLE 23

The general procedure of Example 20 was repeated using an etched aluminium foil in place of the tantalum sintered product, thereby obtaining ten capacitors. These capacitors were evaluated in the same manner as in Example 20.

The repeated number of the procedure for the formation of the polypyrrole was 12.

The etched aluminium foil serving as an electrode was made in the following manner.

An aluminium etched foil having a size of 4 mm×10 mm was partitioned by attachment thereon with a 1 mm wide polyimide tape over opposite sides thereof to make a 3 mm long portion and a 6 mm long portion through the polyimide tape.

An anode lead was attached to the 4 mm wide×3 mm long portion of the aluminium etched foil. The other portion which was 4 mm wide×6 mm long in size was immersed in an aqueous 3% ammonium adipate solution and anodized at about 70° C. by application of 50V to form a dielectric oxide film thereon.

This arrangement was regarded as a capacitor and subjected to measurement of a capacitance in the anodization solution, revealing that the capacitance was 4.92 µF.

When the above procedure was repeated using PDOT in place of EDOT as the monomer and sodium dodecylbenzenesulfonate in place of sodium alkylnaphthalenesulfonate, similar results were obtained.

Comparative Example 5

The general procedure of Example 23 was repeated except that any polypyrrole layer was not formed but the procedure of forming the PEDOT layer was repeated until a thickness of 10 µm was attained, thereby obtaining ten capacitors.

The repetition cycles were 27 necessary for the formation of the PEDOT layer.

These capacitors were subjected to measurements of a capacitance and a loss at 1 kHz and an impedance at 400 kHz. Moreover, each capacitor was subjected to a loaded heat-resistant test by application of 10 V at 125° C. over 1000 hours, after which its variation in capacitance and the loss factor were measured. The average values of these measurements are shown in Table 3.

The comparison between the results of Example 23 and Comparative Example 5 reveals that the capacitor characteristics and the heat resistance are similar to each other, but a greater number of repeated procedures were necessary for the formation of the PEDOT layer in order to attain similar characteristic properties.

This means that in order to ensure similar characteristic properties, a longer time is necessary for the formation of a conductive layer.

Comparative Example 6

The general procedure of Example 23 was repeated without use of sodium alkylnaphthalenesulfonate in both PEDOT and polypyrrole layers, thereby obtaining ten capacitors.

These capacitors were subjected to measurements of a capacitance and a loss at 1 kHz and an impedance at 400 kHz. Moreover, each capacitor was subjected to a loaded heat-resistant test by application of 10 V at 125° C. over 1000 hours, after which its variation in capacitance and the loss factor were measured. The average values of these measurements are shown in Table 3.

The comparison between the results of Example 23 and this comparative example reveals that the capacitor characteristics and the heat resistance of the capacitor of the comparative example were much poorer than those of Example 23.

This is considered for the reason that both PEDOT and polypyrrole layers are formed but not doped with the bulky monovalent alkylnaphthalenesulfonate ions.

Moreover, since sodium alkylnaphthalenesulfonate serving as a surface active agent was used in Example 23, a great difference results in the capacitor characteristics and the heat resistance in comparison with Comparative Example 6.

In this comparative example, sodium alkylnaphthalenesulfonate was not used. Especially, the PEDOT layer was formed only to an extent that the layer is not visually observed on the dielectric film. More particularly, the PEDOT layer was not so formed as to improve the capacitor characteristics and the heat resistance.

The use of the monovalent alkylnaphthalenesulfonate ions improves not only the yield and the electric conductivity of both the PEDOT layer and the polypyrrole layer, but also the capacitor characteristics and the heat resistance.

Reference 3

The general procedure of Example 23 was repeated without formation of any PEDOT layer, but with the polypyrrole layer being formed under the same conditions as in Example 23, thereby obtaining ten capacitors.

These capacitors were subjected to measurements of a capacitance and a loss at 1 kHz and an impedance at 400 kHz. Moreover, each capacitor was subjected to a loaded heat-resistant test by application of 10 V at 125° C. over 1000 hours, after which its variation in capacitance and the loss factor were measured. The average values of these measurements are shown in Table 3.

The comparison between Example 23 and Reference 3 reveals that the capacitance tends to be smaller in Reference 3. This is considered for the reason: because the polymerization rate of pyrrole is so great that the monomer starts to polymerize prior to arrival at the depth of fine pore in the sintered body, thereby clogging part of the fine pores with the resultant polypyrrole.

In contrast, although sodium alkylnaphthalenesulfonate serving as a surface active agent is contained in the EDOT monomer solution to increase the polymerization rate of EDOT, its rate is lower than that of pyrrole. This enables the EDOT monomer to be infiltrated to deeper sites in the sintered body, in which PEDOT is formed. Thus, a higher capacitance is realized.

Using the composite conductive layer including a conductive PEDOT layer and a conductive polypyrrole layer, the resultant capacitor which is better in capacitor characteristics and heat resistance can be efficiently fabricated.

When the monovalent alkylnaphthalenesulfonate ions are doped in the built-up conductive layer, not only the yield and the electric conductivity of the PEDOT layer and the polypyrrole layer increase, but also the resultant capacitor is improved in the capacitor characteristics and the heat resistance. Moreover, these characteristic properties can be further improved owing to the surface activity of the sodium alkylnaphthalenesulfonate.

The PEDOT layer is formed directly on the etched surface on which the dielectric film has been formed, the layer is in intimate contact with the etched aluminium foil, thereby increasing the capacitance.

EXAMPLE 24

The general procedure of Example 23 was repeated except that an aluminium smooth foil having a size of 20 mm×20 mm was used in place of the etched aluminium foil, and that a 0.5 $\mu$m thick polyimide thin film was formed by spin coating in place of the anodized oxide film, thereby obtaining ten capacitors.

The repetition cycles for the formation of the polypyrrole layer were 10.

These capacitors were evaluated in the same manner as in Example 23, with the results shown in Table 3.

Moreover, similar results were obtained when the above procedure was repeated using PDOT of Example 21 in place of EDOT as the monomer and sodium dodecylbenzenesulfonate in place of sodium alkylnaphthalenesulfonate.

Comparative Example 7

The general procedure of Example 24 was repeated without formation of any polypyrrole layer but with the PEDOT layer being formed by repeating the procedure of forming the layer, thereby obtaining ten capacitors.

The immersion procedure of forming the PEDOT layer was repeated 22 times.

These capacitors were subjected to measurements of a capacitance and a loss at 1 kHz and an impedance at 400 kHz. Moreover, each capacitor was subjected to a loaded heat-resistant test by application of 10 V at 125° C. over 1000 hours, after which its variation in capacitance and the loss factor were measured. The average values of these measurements are shown in Table 3.

The comparison between the results of Example 24 and Comparative Example 7 reveal that the capacitor characteristics and the heat resistance are similar to each other but the PEDOT layer had to be formed by repeating the immersion procedure in a greater number.

That is, a longer time was necessary for the formation of the conductive layer.

Comparative Example 8

The general procedure of Example 24 was repeated without addition of any sodium naphthalenesulfonate, thereby obtaining ten capacitors.

These capacitors were subjected to measurements of a capacitance and a loss at 1 kHz and an impedance at 400 kHz. Moreover, each capacitor was subjected to a loaded heat-resistant test by application of 10 V at 125° C. over 1000 hours, after which its variation in capacitance and the loss factor were measured. The average values of these measurements are shown in Table 3.

The comparison between the results of Example 24 and this comparative example reveals that the heat resistance is very low in the comparative example.

This is considered to result from the layers not doped with the bulky monovalent alkylnaphthalenesulfonate ions.

In Example 24, the polyimide film was formed but other types of dielectric polymer films may also be used. Moreover, the formation of the polyimide film may be possible not only by spin coating, but also by electrodeposition on an etched aluminium film.

EXAMPLE 25

The general procedure of Example 20 was repeated except that 0.05 moles/liter of p-nitrophenol was further added to the oxidant solution for the formation of both PEDOT and polypyrrole layers, thereby obtaining ten capacitors.

The capacitors were evaluated in the same manner as in Example 20, with the results shown in Table 3.

Figure 8:
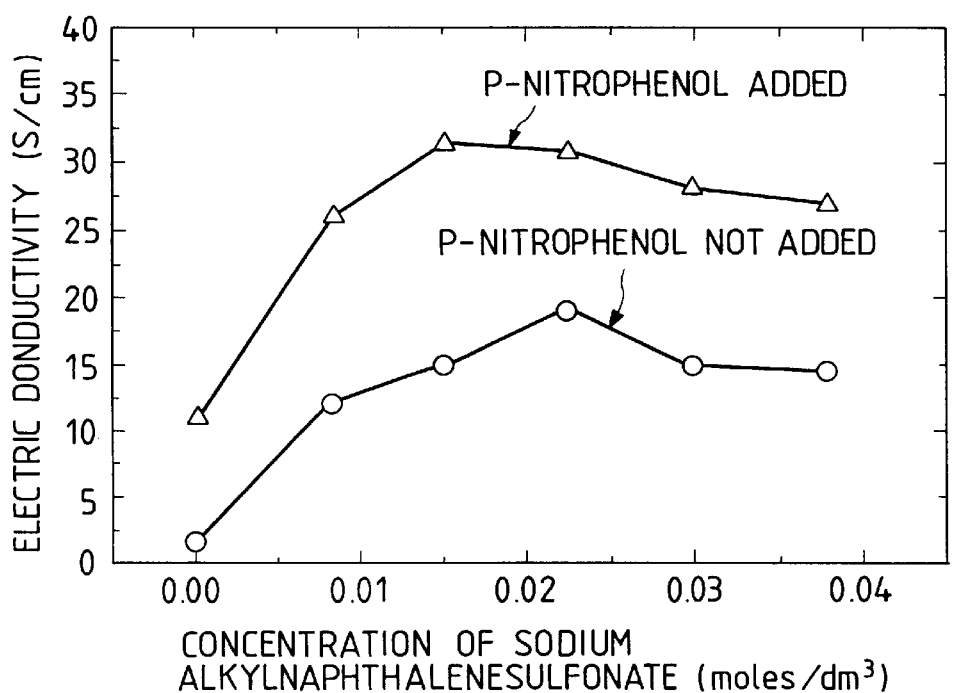
FIG. 8 is a graph showing the electric conductivity of a conductive polymer of ethylene dioxythiophene doped with sodium alkylnaphthalenesulfonate with or without use of p-nitrophenol in an oxidant solution in relation to the variation in amount of sodium alkylnaphthalenesulfonate.

FIG. 8 shows the relation between the electric conductivity and the content of sodium alkylnaphthalenesulfonate for the preparation of conductive polypyrrole for the presence and absence of p-nitrophenol. This figure reveals that the electric conductivity is greater when p-nitrophenol was added. The elemental analysis reveals that any change was observed in the composition of the polypyrrole obtained by addition of polypyrrole, so that the p-nitrophenol was not taken in as a dopant.

The electric conductivity of the resultant PEDOT was not clearly improved by the addition of p-nitrophenol, unlike the polypyrrole. However, it was confirmed that polymerization rate was more accelerated to an extent that fine pores in the sintered body were not clogged with the resultant polymer.

As will be apparent from Table 3, the capacitor of this example is similar in capacitor characteristics and heat resistance to those capacitors of Examples 20 and 21.

In this example, there could be obtained a capacitor which had a high capacitance, a low loss, a good high frequency impedance and a good heat resistance. The use of p-nitrophenol leads to the promoted polymerization reaction of EDOT monomer, with the result that the yield of the conductive polymer increases while permitting EDOT to be infiltrated effectively into fine pores in the sintered body. Thus, the capacitor could be efficiently made by use of p-nitrophenol.

EXAMPLE 26

The general procedure of Example 25 was repeated using, in place of p-nitrophenol, p-cyanophenol (A), m-hydroxybenzoic acid (B), m-hydroxyphenol (C), and m-nitrophenol (D), thereby obtaining ten capacitors for each phenol.

These capacitors were evaluated in the same manner as in Example 20, with the results shown in Table 3.

As will be seen from Table 3, similar results are obtained as in Example 25 with respect to the capacitor characteristics and the heat resistance.

Further, when p-nitrophenol was added to the oxidant solution for both types of conductive polymers in Examples 21 to 24, similar results were obtained.

EXAMPLE 27

The general procedure of Example 20 was repeated using cupric sulfate in place of ferric sulfate at the same concentration used in example 20, thereby obtaining ten capacitors.

These capacitors were evaluated in the same manner as in example 20, with the results shown in Table 3.

The capacitor of this example is slightly inferior in capacitor characteristics and heat resistance to that of Example 20 but is practically acceptable.

When using cupric sulfate in place of ferric sulfate in Examples 21 to 26, similar results as in example 27 were obtained.

EXAMPLE 28

The general procedure of Example 23 was repeated wherein polypyrrole was electrolytically polymerized, not chemically polymerized, thereby obtaining ten capacitors.

These capacitors were evaluated in the same manner as in Example 23, with the results shown in Table 3.

The electrolytic polymerization was effected in an aqueous solution comprising 0.25 mole/liter of pyrrole monomer and 0.1 mole/liter of sodium alkylnaphthalenesulfonate serving as a supporting electrolyte. More particularly, after formation of the PEDOT layer, the PEDOT layer-bearing portion was immersed in the aqueous solution and was brought into contact with a stainless steel electrode for electrolytic polymerization. A counter electrode for the electrolytic polymerization was placed away from the first-mentioned electrode. A potential of 2.5 V was applied between the electrodes to form an electrolytically polymerized polypyrrole layer through the PEDOT layer.

As will be apparent from Table 3, similar results were obtained as in Example 23 with respect to the capacitor characteristics and the heat resistance.

In this example, the PEDOT layer was formed by only one immersion procedure, through which the polypyrrole was built up by the electrolytic polymerization. Like the case where a thermally decomposed manganese dioxide layer as a conductive layer on the dielectric film, there can be obtained a capacitor, which has only a small leakage current, without repainting the dielectric film by chemical conversion treatment prior to the electrolytic polymerization.

More particularly, the leakage current two minutes after application of 10 V to the capacitor of this example was found to be 15 nA on average.

Thus, using the electrolytic polymerization, there can be obtained a capacitor which has a high capacitance, a low loss and a good high frequency impedance characteristic along with a good heat resistance and a small leakage current.

When the polypyrrole layer was formed by electrolytic polymerization in Examples 20 to 22 and 24 to 27, similar results were obtained.

Reference 4

The general procedure of Example 28 was repeated wherein after formation of the dielectric film, the foil was immersed in an aqueous 30% manganese nitrate solution and thermally decomposed at 250° C., followed by repairing the dielectric film by immersion in an aqueous 3% ammonium adipate solution at about 70° C. by application of 40V without formation of any PEDOT layer, thereby completing ten capacitors.

The capacitors were subjected to measurement of leakage current in a manner similar to Example 28, revealing that the current was 37 nA.

These capacitors were evaluated in the same manner as in Example 28, with the results shown in Table 3.

The comparison between the results of Example 28 and this reference reveals that the capacitor characteristics and heat resistance of the capacitor of the reference are slightly inferior to those of the example although the dielectric film was chemically repaired. In this sense, the procedure of Example 28 is advantageous in that the capacitor obtained in Example 28 is high in capacitance and low in loss and has good high frequency impedance and good leakage current characteristic along with a good heat resistance, and repairing of the dielectric film is not necessary, thus the fabrication of the capacitor being very efficient.

Comparative Example 9

The general procedure of Example 28 was repeated except that sodium perchlorate was used in place of sodium alkylnaphthalenesulfonate at the time of the electrolytic polymerization, thereby obtaining ten capacitors.

The capacitors were evaluated in the same manner as in Example 28, with the results shown in Table 3.

The comparison between the results of Example 28 and this comparative example reveals that the capacitor of the comparative example is much inferior in capacitor characteristics and heat resistance to the capacitor of Example 28. This is considered for the reason that sodium perchlorate does not significantly contribute to imparting electric conductivity to the resultant polymer, is not bulky and has no surface activity. Accordingly, sodium perchlorate does not permit the monomer to be satisfactorily infiltrated into etched pits, leading to the lowering of capacitance.

EXAMPLE 29

The general procedure of Example 28 was repeated except that 0.05 moles/liter of p-nitrophenol was added to the electrolytic polymerization solution, thereby obtaining ten capacitors.

The capacitors were evaluated in the same manner as in Example 28, with the results shown in Table 3.

As will be seen from Table 3, the capacitor of this example is further improved in capacitor characteristics and heat resistance over that of Example 28. This is considered owing to the co-existence of p-nitrophenol in the polymerization system, by which the initial electric conductivity and environmental stability of the electrolytically polymerized product are further improved.

When using other types of phenol derivatives, similar results were obtained.

EXAMPLE 30

The general procedure of Example 20 was repeated except that the PEDOT layer was not formed by chemical polymerization, but the anodized tantalum sintered body was immersed in a solution of 0.2 wt% of PEDOT doped with polystyrenesulfonate ions, to which 0.2% of sodium alkylnaphthalenesulfonate was added, at room temperature for 5 minutes, followed by drying at 105° C. for 15 minutes, thereby obtaining ten capacitors.

The PEDOT product doped with polystyrenesulfonate ions was prepared by electrolytic polymerization of EDOT using a polystyrenesulfonate as a supporting electrolyte.

Alternatively, PEDOT may be prepared by oxidation polymerization of EDOT by use of an oxidant containing a polyvalent anion, e.g. ferric sulfate, in co-existence of a polystyrenesulfonate.

These capacitors were evaluated in the same manner as in Example 20, with the results shown in Table 3.

The results of the table reveal that the capacitor of this example similar to that of Example 20 with respect to the capacitor characteristics and the heat resistance.

This is because the polystyrenesulfonate ions are bulky and play substantially the same role as the alkylnaphthalenesulfonate anion derived from sodium alkylnaphthalenesulfonate which is an aromatic sulfonate surface active agent.

In the capacitors of Examples 21 to 29 wherein the PEDOT layer was replaced by the electrolytically polymerized, soluble PEDOT doped with the polystyrenesulfonate ions which were a sulfonate anion, similar results were obtained.

Of course, other types of thiophene derivatives of the afore-indicated formula may be likewise used if the resultant PEDOT's are soluble in a liquid medium. Sulfonate anions other than polystyrenesulfonates ions may be likewise used for the doping provided that they are bulky. Such sulfonate anions include polyvinylsulfonate.

EXAMPLE 31

This examples illustrates a conductive composite layer having a three-layered structure.

In this example, a first conductive layer made of doped PEDOT and a second conductive layer made of doped polypyrrole were successively formed on a porous tantalum sintered body in this order in the same manner as in Example 20 provided that the procedure of forming the polypyrrole layer was repeated only three times.

Thereafter, the body was immersed in a polystyrenesulfonate-doped PEDOT solution having a concentration of 0.2 wt% at room temperature for 5 minutes and dried at 105° C. for 15 minutes.

A cathode was formed in the same manner as in Example 1, followed by coverage with an epoxy resin to provide ten tantalum capacitor having a PEDOT/polypyrrole/PEDOT three-layered structure.

These capacitors were evaluated in the same manner as in Example 20, with the results shown in Table 3.

The capacitor of this example exhibits similar capacitor characteristics and heat resistance as in Example 20 dealing with the double-layered structure. In this example, the chemical polymerization procedure necessary for the formation of the polypyrrole layer can be reduced in repetition number, leading to the remarkable shortage of the treating time. Thus, capacitors having good characteristic properties can be efficiently fabricated.

In this example, the PEDOT layers may be formed by immersion in a polymer solution and drying, and the conductive polypyrrole layer may be formed by electrolytic polymerization.

More particularly, the PEDOT layer or layers may be formed by chemical polymerization or immersion in a conductive polymer solution. The conductive pyrrole layer may be formed by chemical polymerization or electrolytic polymerization.

What is claimed is:

1. A solid electrolytic capacitor which comprises a first electrode and a second electrode, and a dielectric film provided therebetween wherein at least the first electrode comprises a first conductive polymer layer made of a polymer selected from the group consisting of pyrrole and derivatives thereof, said first conductive polymer layer being doped with a mixed dopant of a polyvalent anion and a monovalent anion comprising a sulfonate ion dissociated from an anionic surface active agent.

2. A solid electrolytic capacitor according to claim 1, wherein said polyvalent anion comprises a sulfate.

3. A solid electrolytic capacitor according to claim 1, wherein said dielectric film comprises an oxide of a valve metal and said second electrode comprises a valve metal.

4. A solid electrolytic capacitor according to claim 3, wherein said valve metal is selected form the group consisting of aluminium and tantalum.

5. A solid electrolytic capacitor according to claim 1, wherein said dielectric film comprises a polymer.

6. A solid electrolytic capacitor according to claim 5, wherein said polymer of said dielectric film comprises a polyimide.

7. A solid electrolytic capacitor according to claim 1, wherein said sulfonate comprises alkylnaphthalenesulfonate.

8. A solid electrolytic capacitor according to claim 1, wherein said sulfonate comprises dodecylbenzenesulfonate.

9. A solid electrolytic capacitor according to claim 1, wherein the second electrode comprises said first conductive polymer layer and said dielectric film comprises a polyimide.

10. A solid electrolytic capacitor according to claim 1, further comprising a second conductive polymer layer provided between said dielectric film and said first conductive polymer layer so that said first conductive polymer layer and said second conductive polymer layer comprise a built-up conductive polymer layer wherein said second conductive polymer layer comprises a polymer of a thiophene derivative of the following formula

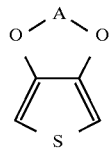

wherein A represents an unsubstituted or substituted alkylene group, O is oxygen and S is sulfur.

11. A solid electrolytic capacitor according to claim 10, wherein said second conductive polymer layer comprises a monovalent anion as a dopant.

12. A solid electrolytic capacitor according to claim 11, wherein said monovalent anion comprises a sulfonate dissociated from an anionic surface active agent.

13. A solid electrolytic capacitor according to claim 10, wherein said second conductive layer comprises a polyvalent anion as a dopant.

14. A solid electrolytic capacitor according to claim 13, wherein said polyvalent anion comprises a sulfate.

15. A solid electrolytic capacitor according to claim 10, wherein said second conductive polymer layer comprises a polystyrenesulfonate anion.

16. A solid electrolytic capacitor according to claim 10, further comprising a third conductive polymer layer in contact with said first conductive polymer layer on a side opposite a side where said second conductive layer is formed, said third conductive polymer layer comprises a polymer of a thiophene derivative of the following formula

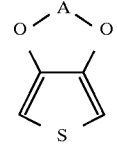

wherein A represents an unsubstituted or substituted alkylene group, O is oxygen and S is sulfur.

17. A solid electrolytic capacitor according to claim 16, wherein said third conductive polymer layer comprises a monovalent anion as a dopant.

18. A solid electrolytic capacitor according to claim 17, wherein said monovalent anion comprises a sulfonate dissociated from an anionic surface active agent.

19. A solid electrolytic capacitor according to claim 16, wherein said third conductive layer comprises a polyvalent anion as a dopant.

20. A solid electrolytic capacitor according to claim 19, wherein said polyvalent anion comprises a sulfate.

21. A solid electrolytic capacitor according to claim 16, wherein said third conductive polymer layer comprises a polystyrenesulfonate anion.

* * * * *